(12) United States Patent
Gosselin

(10) Patent No.: US 10,949,371 B2
(45) Date of Patent: Mar. 16, 2021

(54) INTERACTIVE CONTENT DISTRIBUTION SYSTEM WITH MOBILE CHARGING DEVICE INTERFACE

(71) Applicant: The Empowerment US Company, Burlington, OK (US)

(72) Inventor: Brandon Marcel Gosselin, Burlington, OK (US)

(73) Assignee: The Empowerment US Company, Burlington, OK (US)

( * ) Notice: Subject to any disclaimer, the term of this patent is extended or adjusted under 35 U.S.C. 154(b) by 0 days.

(21) Appl. No.: 16/870,359

(22) Filed: May 8, 2020

(65) Prior Publication Data

US 2020/0356509 A1 Nov. 12, 2020

Related U.S. Application Data

(60) Provisional application No. 62/845,709, filed on May 9, 2019.

(51) Int. Cl.
*H01M 10/46* (2006.01)
*G06F 13/38* (2006.01)
(Continued)

(52) U.S. Cl.
CPC .......... *G06F 13/387* (2013.01); *G06F 1/1607* (2013.01); *G06F 1/1632* (2013.01); *G06F 1/266* (2013.01); *G06F 3/0488* (2013.01); *G06Q 20/00* (2013.01); *H02J 7/00032* (2020.01); *H02J 7/00034* (2020.01); *H02J 13/00001* (2020.01); *H02J 13/00006* (2020.01);
(Continued)

(58) Field of Classification Search
CPC ............... H02J 7/00032; H02J 7/00034; H02J 2207/30; H02J 2310/22; H02J 7/0003; G06F 13/10; G06F 13/14; G06F 13/38; G06F 13/387; G06F 3/14; G06F 1/266; G06F 1/0488; G06F 1/1632; G06F 8/60; G06F 8/61; G06F 16/437; G06F 16/9577
USPC .... 320/107, 114, 115, 116, 137, 162; 710/5, 710/6, 11
See application file for complete search history.

(56) References Cited

U.S. PATENT DOCUMENTS 6,885,869 B2 4/2005 Raith
7,821,449 B2 10/2010 Sheynblat
(Continued)

*Primary Examiner* — Edward Tso
(74) *Attorney, Agent, or Firm* — Gregory Finch; Finch Paolino, LLC

(57) ABSTRACT

An interactive content distribution system with handheld charging device and docking station. Embodiments of the present disclosure provide for an interactive content distribution system comprising a venue paging system comprising one or more handheld charging devices and docking station. In certain embodiments, the docking station serves as a communications hub between a remote server, the handheld charging devices, an administrator computing device, and one or more peripheral devices. Certain embodiments of the system may enable an administrator user to configure various systems controls of the handheld charging devices, including variable charging speed controls and geo-fencing boundaries for the handheld charging devices. In certain embodiments, a user of a mobile electronic device may be presented with digital content via the handheld charging device and/or a user application executing on the mobile electronic device.

20 Claims, 11 Drawing Sheets

(51) Int. Cl.
*H02J 7/00* (2006.01)
*G06F 3/0488* (2013.01)
*G06F 1/16* (2006.01)
*G06F 1/26* (2006.01)
*H02J 13/00* (2006.01)
*G06Q 20/00* (2012.01)
*G06F 3/14* (2006.01)

(52) U.S. Cl.
CPC ........... *G06F 3/14* (2013.01); *H02J 13/00024* (2020.01); *H02J 2207/30* (2020.01); *H02J 2310/16* (2020.01); *H02J 2310/22* (2020.01)

(56) References Cited

U.S. PATENT DOCUMENTS

| | | |
|---|---|---|
| 9,506,446 B2 | 11/2016 | Xinfang |
| 9,805,370 B1 | 10/2017 | Quigley et al. |
| 2003/0132298 A1* | 7/2003 | Swartz ................ G07G 3/00 235/472.02 |
| 2004/0224705 A1 | 11/2004 | Nishimura |
| 2006/0123053 A1* | 6/2006 | Scannell, Jr. ....... G06F 16/9577 |
| 2012/0032945 A1* | 2/2012 | Dare .................. G06F 9/451 345/418 |
| 2012/0303476 A1* | 11/2012 | Krzyzanowski .......... G06F 8/60 705/26.5 |
| 2015/0015182 A1 | 1/2015 | Brandtman et al. |
| 2015/0303727 A1 | 10/2015 | Jeong et al. |
| 2016/0301229 A1 | 10/2016 | Chao et al. |
| 2019/0104501 A1 | 4/2019 | Blumer |

\* cited by examiner

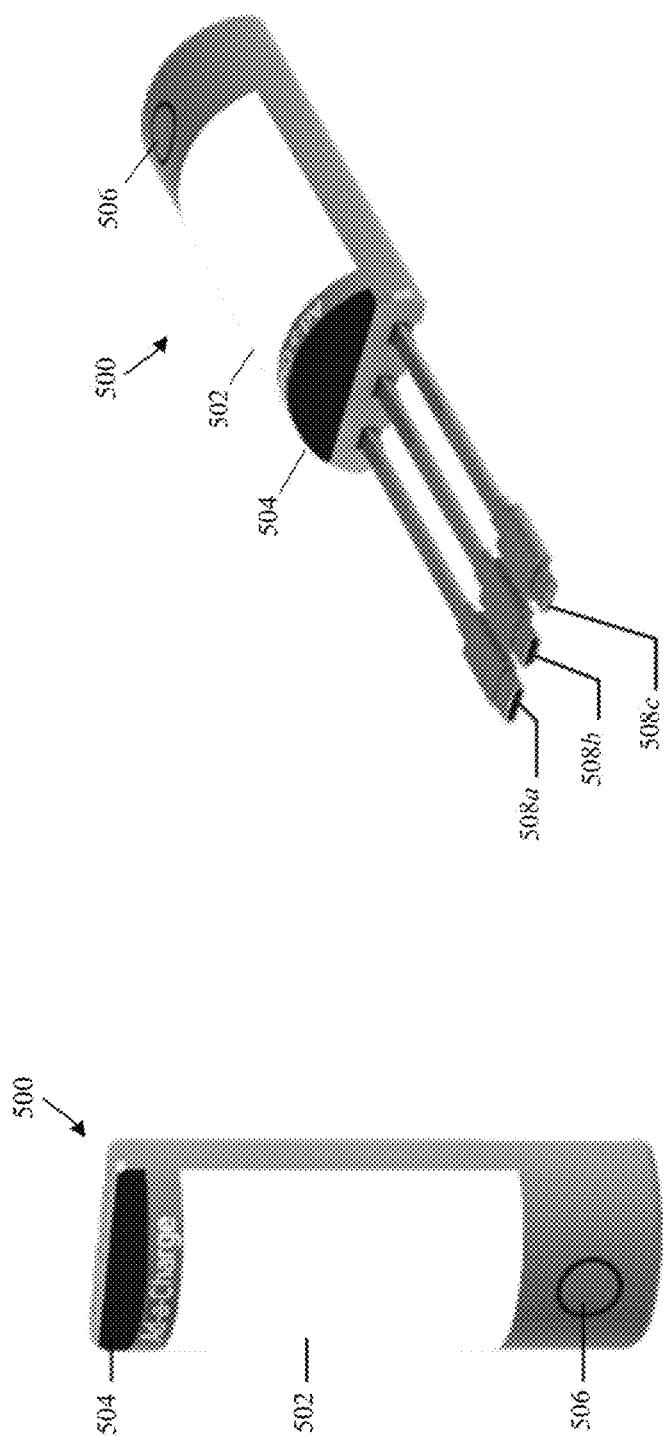

INTERACTIVE CONTENT DISTRIBUTION SYSTEM WITH MOBILE CHARGING DEVICE INTERFACE

CROSS-REFERENCE TO RELATED APPLICATIONS

This application claims the benefit of U.S. Provisional Application Ser. No. 62/845,709, filed on May 9, 2019 and titled "PORTABLE PAGING ASSEMBLY WITH INCORPORATED POWER CHARGER AND ELECTRONIC DISPLAY," the disclosure of which is hereby incorporated in its entirety at least by reference.

FIELD

The present disclosure relates to the field of content distribution networks; more particularly, an interactive content distribution system comprising a venue paging system.

BACKGROUND

Restaurants, bars, and other entertainment venues often provide different types of electronic consoles on tables and/or may distribute electronic consoles to patrons who are waiting for service. Certain prior art systems provide for consoles that include audio/visual output devices to provide customers with multimedia content, such as games, video and/or advertisements.

Customers may interact with the electronic consoles while visiting restaurants, bars, and other entertainment venues that utilize such devices.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present certain exemplified embodiments of the invention in a simplified form as a prelude to the more detailed description that follows.

Certain aspects of the present disclosure provide for an interactive content distribution system, comprising a handheld charging device comprising a rechargeable battery, a charging interface configured to provide power from the rechargeable battery to a mobile electronic device, a wireless communications interface, an input/output device comprising a visual display, and a controller comprising a processor and a non-transitory computer readable medium having processor-executable instructions stored thereon that, when executed, cause the processor to perform one or more operations; a docking station communicably engaged with the handheld charging device, the docking station comprising a docking interface configured to receive the handheld charging device, a charging interface configured to provide power to the rechargeable battery of the handheld charging device, and at least one wireless network interface; and a remote server being communicably engaged with the docking station, the remote server being configured to communicate one or more digital assets to the docking station and receive handheld charging device activity data from the docking station; wherein the one or more operations of the processor comprise operations for: receiving the one or more digital assets from the docking station; presenting the one or more digital assets via the visual display; regulating a flow of power from the rechargeable battery to a mobile electronic device; establishing a communication interface with the mobile electronic device; receiving one or more user input data via the input/output device in response to presenting the one or more digital assets; and providing at least one communication to the mobile electronic device in response to the one or more user input data.

In accordance with certain embodiments, the interactive content distribution system may further comprise an administrator device communicably engaged with the docking station and operable to configure one or more operations of the handheld charging device. In some embodiments, the one or more operations of the processor may comprise operations for communicating a hyperlink or resource locator to the mobile electronic device, the hyperlink or resource locator configured to enable the mobile electronic device to install a mobile application associated with the handheld charging device. The one or more operations of the processor may further comprise operations for restricting or enabling the flow of power from the rechargeable battery to a mobile electronic device in response to one or more user interactions with the handheld charging device. In some embodiments, the mobile application may be configured to receive at least one digital asset from the handheld control device or the remote server. The handheld charging device activity data may comprise one or more user interactions with the handheld charging device and/or the mobile application.

In accordance with certain embodiments, the input/output device of the handheld charging device may comprise a button or touch screen interface configured to initiate at least one communications protocol for the mobile electronic device in response to a user input. In accordance with some embodiments, the docking station may be operably configured as a broker station between the handheld charging device and the remote server.

Further aspects of the present disclosure provide for an interactive content distribution system, comprising a handheld charging device comprising a rechargeable battery, a charging interface configured to provide power from the rechargeable battery to a mobile electronic device, a wireless communications interface, an input/output device comprising a visual display, and a controller configured to command one or more operations of the handheld charging device; a docking station communicably engaged with the handheld charging device, the docking station comprising a docking interface configured to receive the handheld charging device, a charging interface configured to provide power to the rechargeable battery of the handheld charging device, and at least one wireless network interface; a remote server being communicably engaged with the docking station via the at least one wireless network interface, the remote server being configured to send one or more digital assets to the docking station, wherein the docking station is configured to send the one or more digital assets to the handheld charging device; and an administrator device communicably engaged with the docking station via the at least one wireless network interface and operable to configure one or more control settings for the handheld charging device, the one or more control settings being selected from the group consisting of a charging speed setting, a charging duration setting, and a content display setting, wherein the docking station is configured as a communication hub between the administrator device and the handheld charging device.

In accordance with certain embodiments, the handheld charging device may be configured to restrict or enable the flow of power from the rechargeable battery to the mobile electronic device in response to one or more user interactions with the handheld charging device. The administrator device may be operable to configure a geofence setting for the handheld charging device, wherein the geofence setting comprises a virtual boundary beyond which all or some functionality of the handheld charging device is disabled. In some embodiments, the input/output device of the handheld charging device further comprises a button or touch screen interface, wherein the handheld charging device is configured to initiate at least one communications protocol for the mobile electronic device in response to a user input via the button or touch screen interface. In certain embodiments, the at least one communications protocol comprises a temporal relationship between the user input and an output being presented on the visual display.

In certain embodiments of the interactive content distribution system, the handheld charging device may be configured to identify a known mobile electronic device according to one or more authorization parameters. In accordance with said embodiments, the one or more operations of the handheld charging device may comprise configuring one or more content or device settings in response to the one or more authorization parameters.

Still further aspects of the present disclosure provide for an interactive content distribution system, comprising a handheld charging device comprising a rechargeable battery, a charging interface configured to provide power from the rechargeable battery to a mobile electronic device, a wireless communications interface, an input/output device comprising a visual display, and a controller configured to command one or more operations of the handheld charging device; a docking station communicably engaged with the handheld charging device, the docking station comprising a docking interface configured to receive the handheld charging device, a charging interface configured to provide power to the rechargeable battery of the handheld charging device, and at least one wireless network interface; and a remote server configured to provide one or more digital asset or user communication to an end user application being native to the mobile electronic device, the end user application being configured to authorize a charging session between the mobile electronic device and the handheld charging device.

In accordance with certain embodiments of the interactive content distribution system, the remote server may be communicably engaged with the docking station via the at least one wireless network interface and configured to send the one or more digital asset to the docking station for display by the handheld charging device. The handheld charging device may be configured to receive one or more user parameters from the user application and configure one or more content settings in response to the one or more user parameters. In some embodiments, the remote server may be configured to provide the one or more digital asset or user communication to the end user application according to one or more user interactions with the handheld charging device. In said embodiments, the one or more user interactions comprise at least one user input via the input/output device of the handheld charging device.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which:

FIGS. 5A-5D are perspective views of an exemplary handheld charging device and docking station, in accordance with an embodiment of the present disclosure;

DETAILED DESCRIPTION

Figure 1:
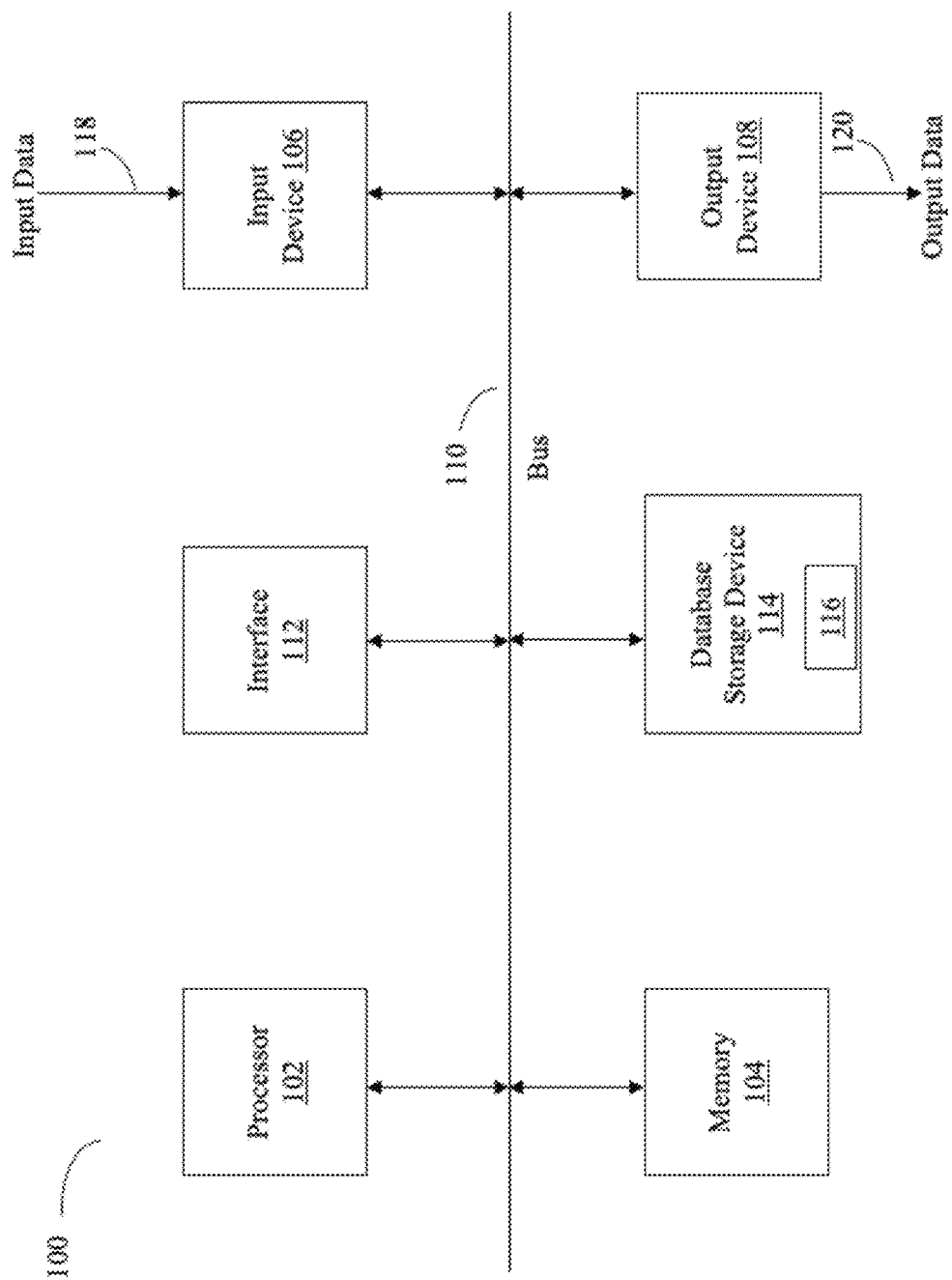
FIG. 1 is a block diagram of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, devices and systems configured to provide for an interactive content distribution system comprising a handheld charging device with a visual display to present digital assets from a remote server and communicate digital assets to a communicably engaged mobile electronic device. In certain embodiments, the handheld charging device may be configured to charge a battery of a mobile electronic device via a connected charging cable. The handheld charging device may be configured to establish a wireless or wireline communications interface with the mobile electronic device to receive and send a plurality of device communications therebetween. In accordance with certain aspects of the present disclosure, the interactive content distribution system comprises a venue paging system comprising one or more handheld charging devices and device docking station. In certain embodiments the device docking station serves as a communications hub between the remote server, the one or more handheld charging devices, an administrator computing device, and one or more peripheral devices. Certain embodiments of the system may enable an administrator user to configure various systems controls of the handheld charging devices, including variable charging speed controls and geo-fencing boundaries. The system may also incorporate ancillary feature sets, including emergency notifications and other alerts. In certain embodiments, a user of a mobile electronic device may interact with the handheld charging device and/or the user application to view and/or receive one or more digital assets from the handheld charging device and/or the remote server. The one or more digital assets may comprise one or more commercial advertisements.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "packet" refers to any formatted unit of data that may be sent and/or received by an electronic device.

As used herein, the term "payload" refers to any part of transmitted data that constitutes an intended message and/or identifying information.

As used herein, the term "interface" refers to any shared boundary across which two or more separate components of a computer system may exchange information. The exchange can be between software, computer hardware, peripheral devices, humans, and combinations thereof.

As used herein, the term "native" refers to any software program that is installed on a mobile electronic device.

As used herein, the term "peripheral device" refers to any internal or external device that connects directly to a computer but does not contribute to the computer's primary function. In certain embodiments, a peripheral device may include any device configured to connect to a central device over a wireless communications interface, such as Bluetooth. In certain embodiments, a peripheral device may include an electronic device configured to transmit an advertisement. In certain device interactions, the same device may constitute a peripheral device in some instances and a central device in other instances.

As used herein, the term "central device" refers to any electronic device configured to establish a communications interface with a peripheral device. In certain embodiments, a central device may include an electronic device configured to receive an advertisement packet from a peripheral device.

As used herein, the term "master" refers to a configuration in a communications model in which one device or process (known as the master) controls one or more other devices or processes (known as slave(s)).

As used herein, the term "slave" refers to a configuration in a communications model in which one or more other devices or processes (known as the slave(s)) are controlled by one or more other device or process (known as the master).

As used herein, the term "remote" refers to any element of a computing system that provides direct or indirect communication(s) to another element over a communications interface, i.e. any element that functions externally to another element. A communications interface may include a networked interface, such as a LAN or WAN, or may include a distributed computing environment in which one or more system elements may communicate through one or more intermediary systems and/or protocols.

As used herein, the term "handheld" refers to any form factor that is of a size small enough to be used or operated while held in the hand or hands of a user. As used herein, the term "handheld" is not limited to form factors that are designed to be held in the hand or hands of a user, or that are actually held in the hand or hands of a user during operation. Rather, the term "handheld" refers to any form factor that is of a size small enough to be capable of being used or operated while held in the hand or hands of a user.

As used herein, the term "docking station" refers to any device that is configured to provide power and/or communications to one or more other devices. In certain embodiments, a "docking station" may be a central device and the one or more other devices may comprise a peripheral device.

An exemplary system, method, and devices according to the principles herein may include: 1) one or more handheld charger with an input/output device including a display screen, 2) a docking station with which one or more handheld chargers may be interfaced for charging and data transfer, and 3) a human-machine interface configured to host for managing a queue of patrons at a venue and sending notifications to handheld chargers.

Certain benefits and advantages of the present disclosure over prior art venue paging systems include providing user of a mobile electronic device with a means to charge the mobile electronic device (e.g. smartphone or tablet computer) while the end user waits for service at venue and/or during the end user's patronage of the venue, and present digital content, such as advertisements, to the end user via a visual display.

In accordance with an exemplary use case provided by embodiments of the present disclosure, an interactive content distribution system comprising a handheld charging device may be implemented in a restaurant venue. In such an exemplary use case, the interactive content distribution system may be operably engaged wherein a patron of the restaurant (i.e., an end user) may approach a restaurant host (i.e., an administrative user). If a table is not immediately ready, the host may input the patron's name into an administrator device (i.e. a human-machine interface for the system). The restaurant host may assign a handheld charger to the patron via the human-machine interface, remove the handheld charger from a docking station serving as a storage location for the handheld chargers, and provide one or more handheld charger to the patron(s). Upon being assigned to the patron, the handheld charger may begin displaying content to the patron via a visual display. In certain embodiments, the content includes one or more advertisements and one or more device prompts configured to encourage the patron to take one or more actions. For example, an exemplary prompt may state "5 FREE Minutes of Charge. For unlimited FREE charge, download the App and pair your device." Upon establishing a charging interface between the handheld charger and the mobile electronic device, and/or upon downloading the user application and establishing a communication interface between the handheld charger and the mobile device, the handheld charger may resume displaying content on the display. The administrative user and/or the server may configure the duration of the charging session, and the time limit indicated on the handheld charger may reflect the established time limit. The time limit may be latched until the server pushes a time limit change to the docking station, which may be configured to write changes to the handheld controller over a communications interface.

In further accordance with the exemplary use case, upon expiration of the free charging period, if the patron has not paired his or her mobile electronic device with the handheld charger, the handheld charger will discontinue charging the mobile electronic device and begin to vibrate and flash and/or display one or more user prompts requesting one or more user actions (for example, to download the user application) to continue the charging session. Once the restaurant venue is ready to provide service to the patron, the restaurant host may select the patron's name from the queue in the human-machine interface and initiating a paging command to the docking station, which provides the command to the handheld charging device to execute a paging function. In "page mode", the handheld charger may beep, vibrate, flash and/or present a message to the patron on the handheld charger display informing the patron to return to the restaurant host to receive service. Once the patron returns the handheld charger to the restaurant host, the restaurant host may select the handheld charger assigned to the patron from the queue in the human-machine interface and configure the handheld charger in at least one secondary mode of operation. In the secondary mode of operation, the handheld charger may resume providing content via the visual display and may resume charging the patron's phone. The patron may leave the handheld charger at the table (or other location of service) upon exiting the restaurant. The handheld charger may then be returned to the docking station for subsequent use.

FIGS. 1-10 are incorporated by reference in their entireties into the following detailed description. Turning now descriptively to the drawings, in which similar reference characters denote similar elements throughout the several views, FIG. 1 depicts a computing system in which certain illustrated embodiments of the present invention may be implemented.

Referring now to FIG. 1, a processor-implemented computing device in which one or more aspects of the present disclosure may be implemented is shown. According to an embodiment, a processing system 100 may generally comprise at least one processor 102, or a processing unit or plurality of processors, memory 104, at least one input device 106 and at least one output device 108, coupled together via a bus or a group of buses 110. In certain embodiments, input device 106 and output device 108 could be the same device. An interface 112 can also be provided for coupling the processing system 100 to one or more peripheral devices, for example interface 112 could be a PCI card or a PC card. At least one storage device 114 which houses at least one data storage structure 116 can also be provided. The memory 104 can be any form of memory device, for example, volatile or non-volatile memory, solid state storage devices, magnetic devices, etc. The processor 102 can comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or a wireless data adaptor, a data acquisition card, etc. Input data 118 can come from different sources, for example keyboard instructions in conjunction with data received via a network. Output device 108 produces or generates output data 120 and can comprise, for example, a display device or monitor in which case output data 120 is visual, a printer in which case output data 120 is printed, a port, such as for example a USB port, a peripheral component adaptor, a data transmitter or antenna such as a modem or wireless network adaptor, etc. Output data 120 can be distinct and/or derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one data storage structure 116. The interface 112 may allow wired and/or wireless communication between the processing unit 102 and peripheral components that may serve a specialized purpose. In general, the processor 102 can receive instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 can be communicated to other devices via the network. The transfer of information and/or data over the network can be achieved using wired communications means or wireless communications means. A server can facilitate the transfer of data between the network and one or more databases. A server and one or more database(s) provide an example of a suitable information source.

Thus, the processing computing system environment 100 illustrated in FIG. 1 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the invention may be implemented. That is, FIG. 1 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, description will now turn towards illustrated embodiments of the present invention which generally relate to systems, devices, and methods for an interactive content distribution system comprising a handheld charging device with a visual display configured to present digital assets from a remote server and communicate digital assets to a communicably engaged mobile electronic device. It is to be understood and appreciated that certain aspects of the methods and system routines described herein comprise receiving one or more digital content files from the docking station; presenting the one or more digital content files via the visual display; regulating a flow of power from the rechargeable battery to a mobile electronic device; establishing a communication interface with the mobile electronic device; receiving one or more user input data via the input/output device in response to presenting the one or more digital content files; and communicating at least one digital content file to the mobile electronic device in response to the one or more user input data.

Figure 2:
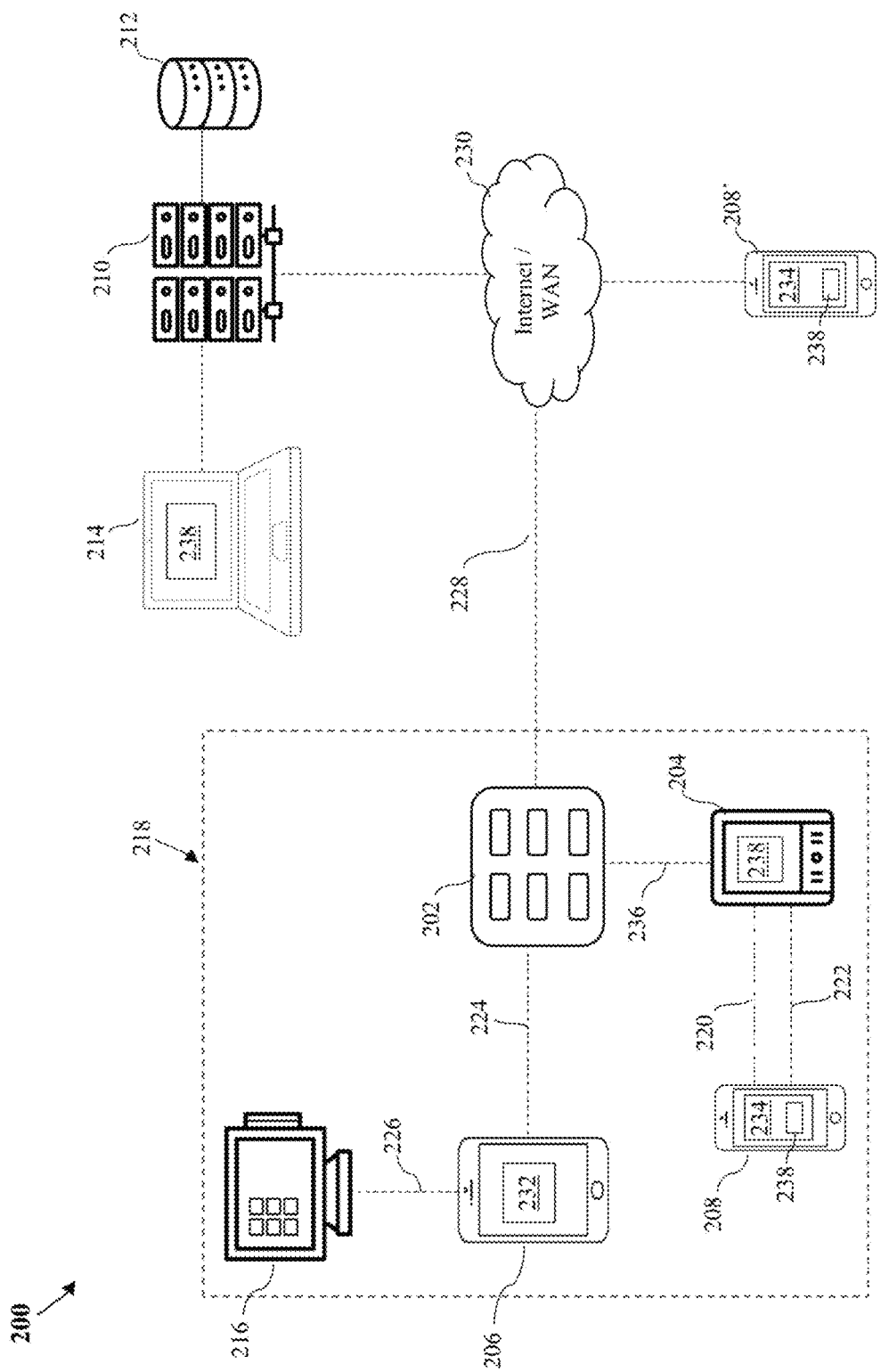
FIG. 2 is an architecture diagram of a content distribution system with mobile charging interface, in accordance with an embodiment of the present disclosure.

Referring now to FIG. 2, an architecture diagram of a content distribution system 200 is shown. In accordance with certain aspects of the present disclosure, content distribution system 200 comprises a docking station 202, a handheld charger 204, an administrator device 206, and a server 210. Server 210 may be communicably engaged with at least one workstation 214 and at least one database 212. In accordance with certain embodiments, docking station 202 may be configured to receive one or more handheld charger 204 and provide a power interface to charge an internal battery of handheld charger 204. Handheld charger 204 may be configured to establish a communications interface 222 and/or a power delivery interface 220 with a mobile electronic device 208 to provide power and/or data thereto. In certain embodiments, mobile electronic device 208 is a smart phone, tablet computer, or portable computing device. System 200 may further comprise, optionally, one or more third-party system 216. Third-party system 216 may include one or more of a restaurant point-of-sale system, a venue management system, a customer relationship management system, and/or other business management systems related to the operation and/or management of one or more venues. In certain embodiments, third-party system 216 is communicably engaged with administrator device 206 to send and receive data therebetween.

In accordance with certain aspects of the present disclosure, docking station 202, handheld charger 204, mobile device 208, administrator device 206, and (optionally) third-party system 216 may be communicably and operably engaged within a physical location defined by a virtual boundary 218. The physical location may include a business venue, such as a restaurant, and virtual boundary 218 may comprise a 360-degree radius in which docking station 202 comprises a center point. In certain embodiments, virtual boundary 218 defines a maximum distance from docking station 202 in which handheld charger 204 may be operable. In certain embodiments, mobile device 208 may be defined as mobile device 208' when outside of virtual boundary 218, and mobile device 208 when inside of virtual boundary 218. When outside of virtual boundary 218, mobile device 208' may be communicably engaged with server 210 via an Internet connection to send and receive one or more communications via end user application 234. When inside of virtual boundary 218, mobile device 208 may be communicably engaged with handheld charger 204 over communications interface 222 and may be further communicably engaged with handheld charger 204 via end user application 234.

In accordance with certain aspects of the present disclosure, and still referring to FIG. 2, content distribution system 200 may be configured to communicate content, including delivery of one or more digital assets, from handheld charger 204 to mobile electronic device 208. In accordance with an embodiment, docking station 202, handheld charger 204, and administrator device 206 are operably engage within virtual boundary 218. A user of administrator device 206 may configure, via human-machine interface 232, a communications interface 224 between administrator device 206 and docking station 202. Docking station 202 may establish a communications interface 236 with handheld charger 204. Docking station 202 may establish a communications interface 228 with server 210 via an Internet/WAN connection 230. Docking station 202 may be configured as a communications hub to receive and send communications between server 210, handheld charger 204, and administrator device 206. In accordance with certain embodiments, human-machine interface 232 may comprise a graphical user interface configured to enable a user of administrator device 206 to configure and control a plurality of operations/functions of handheld charger 204. In accordance with certain embodiments, human-machine interface 232 may comprise a graphical user interface configured to enable a user of administrator device 206 to (a) manage a plurality of handheld chargers 204; (b) monitor the status of a queue of handheld chargers 204 being assigned to one or more patrons and engaged in an operational mode; (c) select one or more handheld chargers 204 for notification and/or engage one or more handheld chargers 204 in a paging mode; (d) remove handheld chargers 204 from a queue; (e) manage the queue of handheld chargers 204, including changing the order of the queue; (f) establish a communications interface 226 with one or more third-party system 216 to enable one or more management function, such as monitoring the status of resource availability (e.g. tables); (g) assign handheld chargers 204 to specific customers; (h) render and display an overlay of the location of each handheld charger 204 on a graphical map; (i) configure one or more parameters for virtual boundary 218; (j) add/remove handheld chargers 204 and docking stations 202 from a device registry; (k) display a charge level of each handheld charger 204 in a device registry; (l) configure a charging speed for handheld charger 204 (e.g., a "Restaurant Mode" (105% of normal speed) and a "Bar Mode" (90% of normal speed)); (m) engage one or more handheld chargers 204 into alarm mode; (n) configure a time limit for a charging session between handheld charger 204 and mobile electronic device 208; (o) configure and provide one or more static assets to handheld charger 204, such as a digital file of a restaurant menu; and (p) establish communications interface 228, communications interface 224, communications interface 236, and communications interface 226.

In accordance with certain aspects of the present disclosure, administrator device 206, docking station 202, handheld charger 204, and server 210 are operably engaged to provide digital content to a user of mobile device 208. In certain embodiments, the digital content comprises a commercial advertisement. The digital content may further comprise one or more interactive games and/or creative content, such as movies, television shows, and/or music. Workstation 214 may be communicably engaged with server 210 to configure one or more digital assets 238 comprising the digital content and provide the digital assets 238 to server 210. Server 210 may store the digital assets 238 in database 212. Server 210 may communicate digital assets 238 to docking station 202 and docking station 202 may communicate digital assets 238 to handheld charger 204, which may store digital assets 238 in local memory. Administrator device 206 may configure one or more controls/logic via human-machine interface 232 to cause handheld charger 204 to render digital assets 238 and present the digital content via an integrated display device, which may be provisioned to handheld charger 204 by docking station 202 via communications interface 236. Human-machine interface 232 may be configured to enable a user of administrator device 206 to initiate a first mode of operation for handheld charger 204. Upon initiating a first mode of operation, handheld charger 204 may be configured to render digital assets 238 and display content on the display device. Handheld charger 204 may be configured to prompt the user of mobile electronic device 208 to establish communications interface 222 and/or power transfer interface 220 between mobile electronic device 208 and handheld charger 204. Handheld charger 204 may be configured to determine whether the user of mobile electronic device 208 is a known user of system 200 by determining, for example, whether mobile electronic device 208 has end user application 234 installed thereon. In certain embodiments, end user application 234 is a native mobile application installed on the operating system of mobile electronic device 208. End user application 234 may also comprise a hybrid mobile application or a Web application that is executed via a mobile browser. Handheld charger 204 may be configured to selectively enable/disable power transfer interface 220, and/or configure one or more power transfer permissions, in response to the one or more user interactions. Handheld charger 204 may communicate device data, including device usage data and user interaction data, to docking station 202. Docking station 202 may communicate the device data to server 210 and/or administrator device 206. Server 210 may store the device data in database 212 and may further configure and/or select digital assets 238 in accordance with the device data. Server 210 may provide one or more push communications to mobile electronic device 208' in accordance with the device data, including one or more digital assets 238. Handheld charger 204 may be configured to provide digital assets 238 to mobile electronic device 208 in response to one or more user interactions between handheld charger 204 and/or mobile electronic device 208. In accordance with various aspects of the present disclosure, handheld charger 204 may be configured to provide digital assets 238 to mobile electronic device 208 in accordance with one or more communications protocols. In certain embodiments, handheld charger 204 may be configured to provide a communication to mobile electronic device 208 comprising a data packet containing a resource identifier or other data structure configured to facilitate and/or authorize mobile electronic device 208 to retrieve one or more digital assets 238 from server 210. In other embodiments, handheld charger 204 may be configured to communicate user interaction data and/or device activity data to docking station 202. Docking station 202 may communicate the user interaction data and/or device activity data to server 210, and server 210 may provide one or more digital assets 238 to mobile electronic device 208. In certain embodiments, digital assets 238 may include an optical code (for example, a QR code) that is presented concurrently with other content being presented on the visual display of handheld charger 204 (for example, the optical code may be embedded or overlaid with other digital content be presented on the visual display). In such embodiments, mobile electronic device 208, and/or one or more ancillary mobile electronic devices, may be configured to scan the optical code in order to retrieve one or more of digital assets 238 from server 210.

Figure 3:
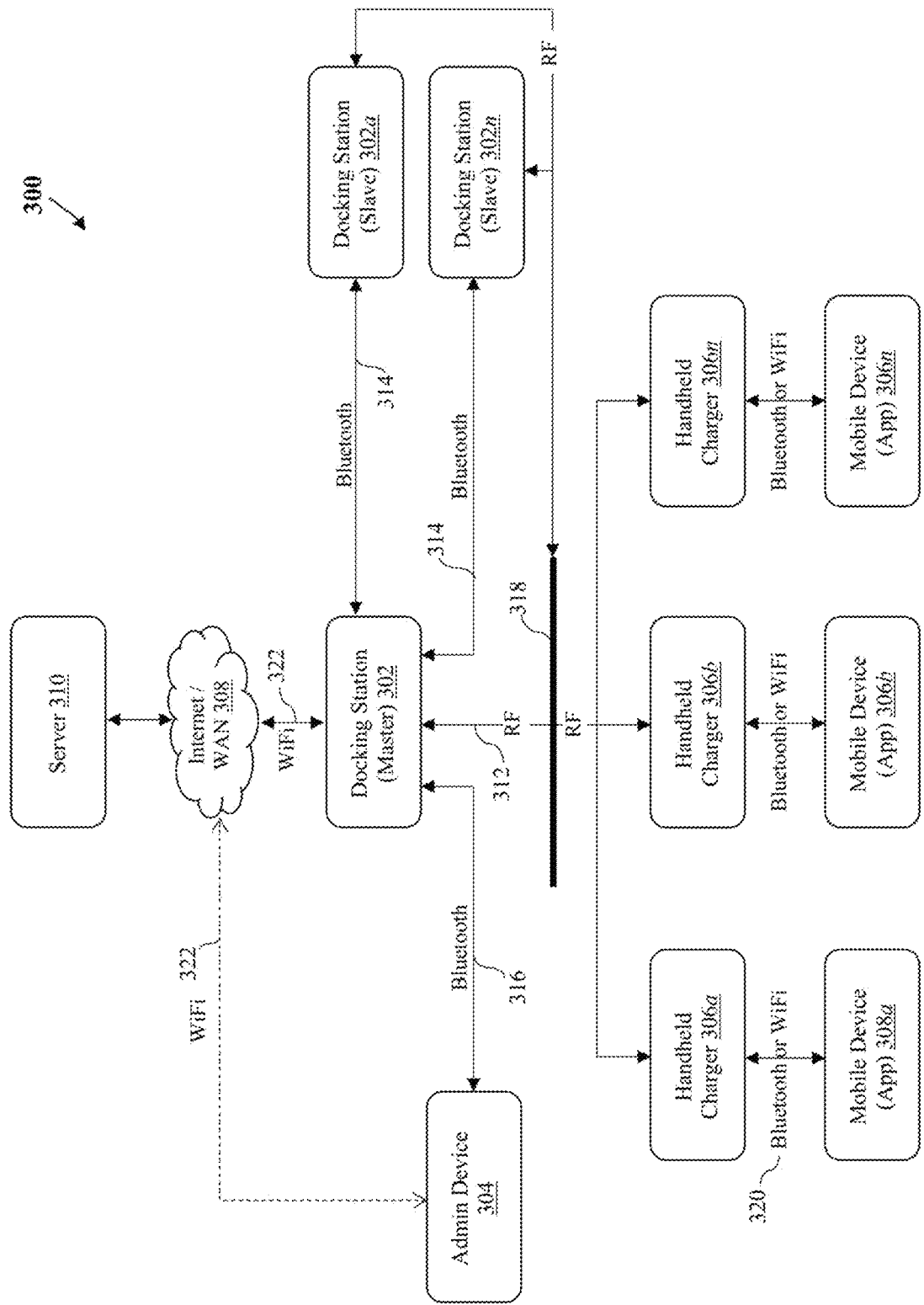
FIG. 3 is a block diagram of certain network protocols for a content distribution system with mobile charging interface, in accordance with certain aspects of the present disclosure.

Referring now to FIG. 3 (with references to FIG. 2), a block diagram of network protocols within a content distribution system 300 is shown. In accordance with certain aspects of the present disclosure, content distribution system 300 may be comprised of a server 310, docking station master 302 and optionally one or more docking station slaves 302a-n, an administrator device 304, one or more handheld chargers 306a-n, and one or more mobile electronic devices 302a-n. In accordance with certain aspects of the present disclosure content distribution system 300 may be embodied as content distribution system 200 (as shown in FIG. 2), wherein server 310 may comprise server 210, docking station master 302 and docking station slaves 302a-n may each comprise docking station 202, administrator device 304 may comprise administrator device 206, handheld chargers 306a-n may each comprise handheld charger 204, and mobile electronic devices 302a-n may each comprise mobile electronic device 208.

In accordance with certain aspects of the present disclosure, system 300 may comprise a plurality of network protocols comprising a plurality of rules, procedures and formats to define communication between server 310, docking station master 302, one or more docking station slaves 302a-n, an administrator device 304, one or more handheld chargers 306a-n, and one or more mobile electronic devices 302a-n. In certain embodiments, docking station master 302 is configured as a central device and one or more docking station slaves 302a-n are configured as peripheral devices. Docking station master 302 may be configured to establish a network interface 314 with one or more docking station slaves 302a-n in which docking station master 302 is established as a master device and docking station slaves 302a-n are slave devices in a network communication protocol. In accordance with an embodiment, network interface 314 may comprise a BLUETOOTH protocol. In accordance with an embodiment, docking station master 302 may be configured as a broker station for communication between handheld chargers 306a-n and administrator device 304 and/or server 310.

Docking station master 302 and docking station slaves 302a-n may be communicably engaged with handheld chargers 306a-n via network interface 312. In certain embodiments, network interface 312 may comprise a radio frequency protocol comprising one or more sub-gigahertz radio frequency bands to enable lower power consumption and long-range transmissions. In certain embodiments, network interface 312 may comprise a LORA protocol. In some embodiments, handheld chargers 306a-n may be configured to send one or more communications to docking station master 302 and/or docking station slaves 302a-n via network interface 312 to determine whether handheld chargers 306a-n have exceeded a virtual boundary (i.e., a threshold distance from docking station master 302 and/or docking station slaves 302a-n). In some embodiments, network interface 312 may further comprise at least one tunneling protocol 318 through which communications from handheld chargers 306a-n and docking station slaves 302a-n may be repackaged and sent by docking station master 302 to server 310 via Internet/WAN 308. Tunneling protocol 318 may be further operable to encapsulate one or more communications over network interface 312 to enable a data transfer interface between network interface 312 and Internet/WAN 308, in which docking station master 302 is a broker station.

In certain embodiments, administrator device 304 may be communicably engaged with docking station master 302 via network interface 316. Network interface 314 may comprise a BLUETOOTH protocol. Network interface 314 may be operably engaged with tunneling protocol 318 to establish a communications interface with Internet/WAN 308, in which docking station master 302 is a broker station between administrator device 304 and server 310. In other embodiments, administrator device 304 may be communicably engaged with server 310 via a WIFI connection 322. In certain embodiments, administrator device 304 may be configured as a central device and docking station master 302 may be configured as a peripheral device, and vice versa. In accordance with certain embodiments, network interface 316 may comprise certain protocols in which docking station master 302 is configured as a master device and administrator device 304 is configured as a slave device; and may further comprise certain protocols in which docking station master 302 is configured as a slave device and administrator device 304 may be configured as a master device. In accordance with certain aspects of the present disclosure, handheld chargers 306a-n may be communicably engaged with mobile electronic devices 302a-n via network interface 320. In certain embodiments, network interface 320 may be configured as a BLUETOOTH protocol or a WIFI protocol. Handheld chargers 306a-n may be configured to receive one or more network communications containing one or more data packets from docking station master 302 via network interface 312 and may be configured to send one or more network communications containing the one or more data packets from handheld chargers 306a-n to docking station master 302 via network interface 312. In accordance with certain embodiments, the one or more data packets may comprise a digital content file. In accordance with certain embodiments, network interface 320 may comprise certain protocols in which handheld chargers 306a-n is/are configured as a master device and mobile electronic devices 302a-n is/are configured as a slave device; and may further comprise certain protocols in which handheld chargers 306a-n is/are configured as a slave device and mobile electronic devices 302a-n is/are configured as a master device. In certain embodiments, mobile electronic devices 302a-n may communicate one or more user-generated data and/or device activity data to handheld chargers 306*a-n* via network interface 320. Handheld chargers 306*a-n* may communicate the one or more user-generated data and/or device activity data to docking station master 302 and/or docking station slaves 302*a-n* via network interface 312. Docking station master 302 may communicate the one or more user-generated data and/or device activity data to administrator device 304 via network interface 316; and docking station master 302 may communicate the one or more user-generated data and/or device activity data to server 310 via network interface 322.

Figure 4:
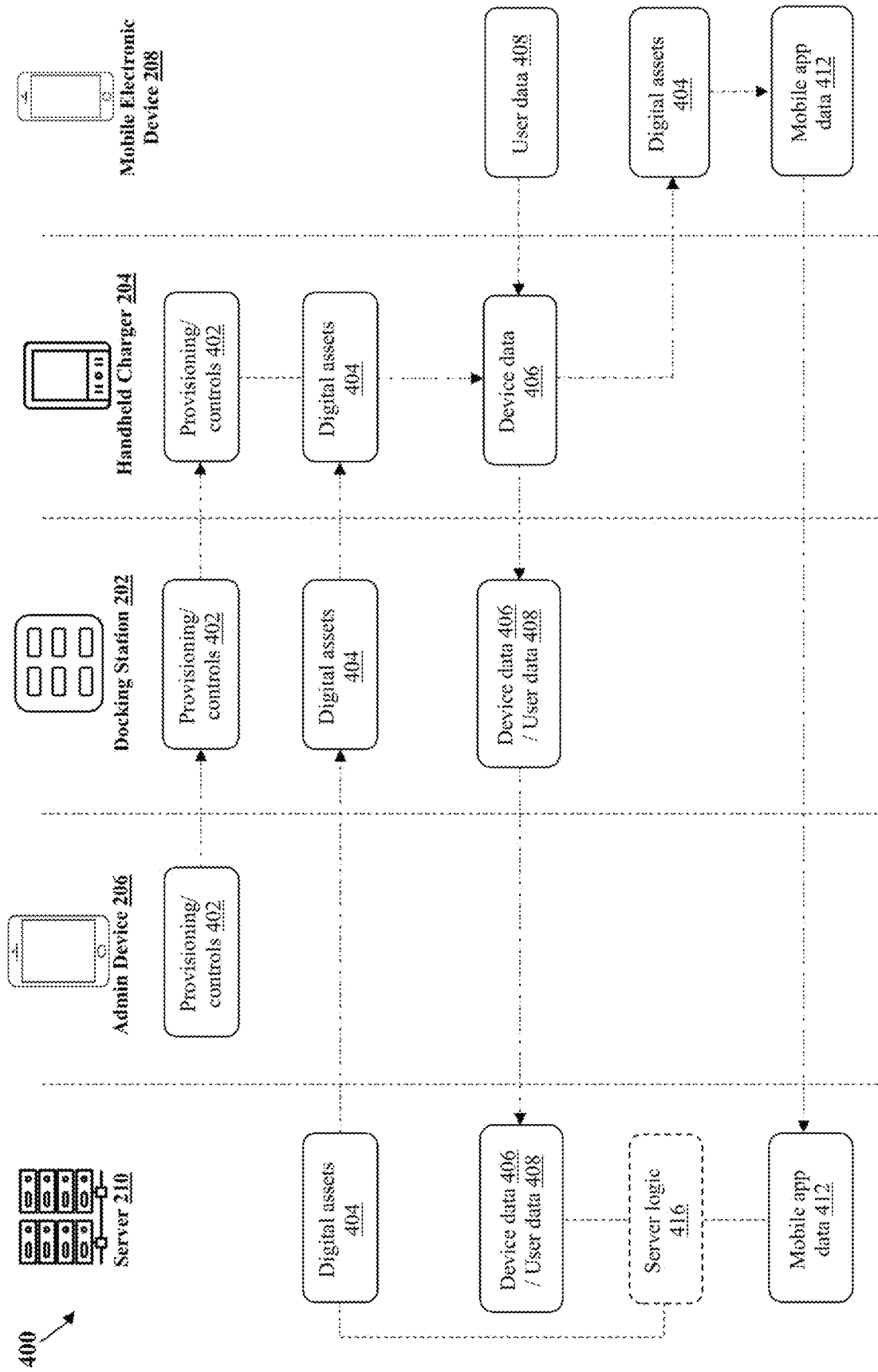
FIG. 4 is a data flow diagram for a content distribution system with mobile charging interface, in accordance with certain aspects of the present disclosure.
Figure 5D:
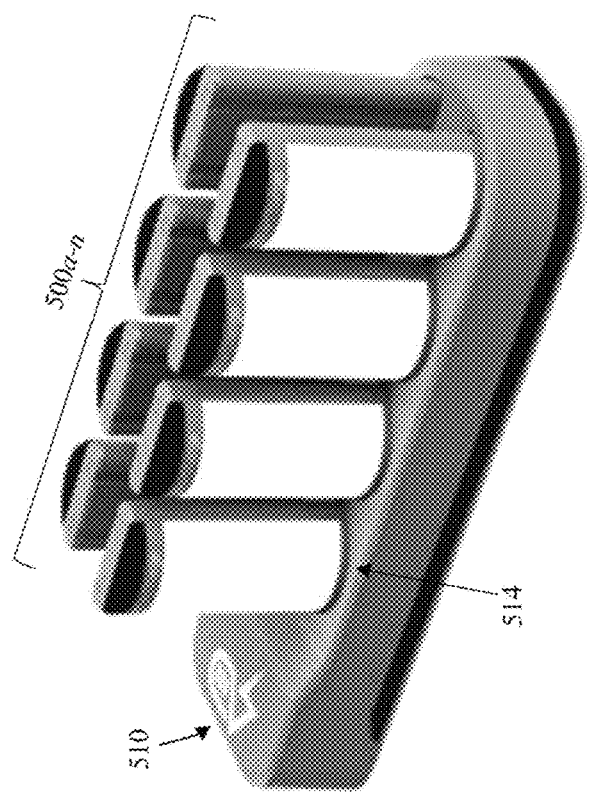
Figure 5C:
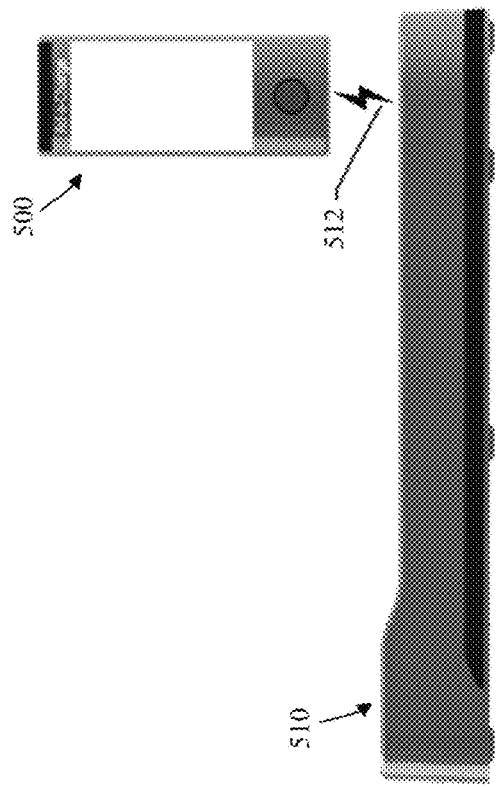

Referring now to FIG. 4, a flow diagram of a data flow schema 400 for a content distribution system is shown. In accordance with certain aspects of the present disclosure, data flow schema 400 may be implemented in accordance with the network protocols of system 300, as shown in FIG. 3. Data flow schema 400 may define a data flow between one or more elements within system 200, as shown in FIG. 2; for example, server 210, administrator device 206, docking station 202, handheld charger 204 and mobile electronic device 208. In accordance with certain aspects of the present disclosure, data flow schema 400 is configured to define provisioning and control data 402 at administrator device 206. Provisioning and control data 402 may be communicated from administrator device 206 to docking station 202, and communicated from docking station 202 to handheld charger 204. Provisioning and control data 402 may be stored in local memory of handheld charger 204. Provisioning and control data 402 may comprise network provisioning data to establish network protocols between the administrator device 206, docking station 202, and handheld charger 204. Provisioning and control data 402 may also comprise control data to configure one or more operations of handheld charger 204 including, but not limited to, geofence settings, content display controls, charging speed, charging session duration, and configuring one or more operational modes such as a paging mode.

In accordance with certain aspects of the present disclosure, data flow schema 400 is configured to define a plurality of digital assets 404 at server 210. One or more digital assets 404 may be communicated from server 210 to docking station 202, and communicated from docking station 202 to handheld charger 204. One or more digital assets 404 may be stored in local memory of handheld charger 204. One or more digital assets 404 may comprise one or more static or dynamic digital content files. In an embodiment, digital assets 404 comprise digital content comprising a commercial advertisement. Digital assets 404 may further comprise one or more dynamic content files, such interactive games. Digital assets 404 may comprise multiple file formats such as image file formats, video file formats, and/or audio file formats.

In accordance with aspects of the present disclosure, handheld charger 204 may initiate a charging session with mobile electronic device 208. In certain embodiments, mobile electronic device 208 may generate user data 408 during the charging session, and handheld charger 204 may generate device data 406 during the charging session. User data 408 may comprise user-generated data such as user inputs into a mobile application and may further comprise static user data, such as user/device identification data. Device data 406 may include device activity data, such as device inputs (e.g., button presses), duration of charging session, duration of display of digital assets, timing and identification of display of digital assets, and temporal data for device inputs, charging initiation/duration, and display of digital assets. Handheld charger 204 may receive user data 408 from mobile electronic device 208 and communicate user data 408 and device data 406 to docking station 202. Docking station 202 may receive user data 408 and device data 406 and communicate user data 408 and device data 406 to server 210. Server 210 may receive user data 408 and device data 406 and store user data 408 and device data 406 in a database.

In accordance with aspects of the present disclosure, handheld charger 204 may communicate one or more digital assets 404 to mobile electronic device 208 in response to receiving/processing user data 408 and/or device data 406. In accordance with certain embodiments, handheld charger 204 communicate one or more digital assets 404 to mobile electronic device 208 in response to receiving a device input while displaying content on a display device. In certain embodiments, handheld charger 204 may communicate the digital asset 404 to mobile electronic device 208 according to a temporal relationship between the device input and the content being displayed on the display device. In certain embodiments, mobile electronic device 208 receives digital asset 404 and stores it in local memory. In other embodiments, mobile electronic device 208 receives digital asset 404 via a mobile application, through which digital asset 404 is stored in a remote server and accessible to mobile electronic device 208 via the mobile application. In accordance with certain aspects of the present disclosure, mobile application data 412 may be generated in response to one or more user interactions with the mobile application; for example, accessing digital asset 404. Mobile electronic device 208 may be configured to communicate mobile application data 412 to server 210. Server 210 may be configured to receive and process mobile application data 412 according to server logic 416. Server logic 416 may be configured to select, modify and/or configure additional digital assets 404 to be distributed to docking station 202 and handheld charger 204 in response to mobile application data 412. In certain embodiments, server 210 may be configured to receive and process user data 408 and device data 406 according to server logic 416. Server logic 416 may be further configured to select, modify and/or configure additional digital assets 404 to be distributed to docking station 202 and handheld charger 204 in response to user data 408 and device data 406.

Referring now to FIGS. 5A-5D, perspective views of an exemplary handheld charger 500 and docking station 510 are shown. In accordance with certain aspects of the present disclosure, handheld charger 500 may comprise an exemplary embodiment of handheld charger 204 of system 200, as shown in FIG. 2. Docking station 510 may comprise an exemplary embodiment of docking station 202 of system 200, as shown in FIG. 2. In certain embodiments, handheld charger 500 may be comprised of a housing having a form factor being configured to be held in a hand or hands of a user during use. Handheld charger 500 may be comprise of a display screen 502, a lighting output 504, and an input device 506. Handheld charger 500 may comprise a housing constructed from plastic and may be assembled such that an interior portion of the housing is waterproof when submerged in water. Display screen 502 may comprise an LED display and may be configured to display images and/or videos. Lighting output 504 may comprise one or more LEDs, or other light sources, and be configured to pulse, flash and/or modulate a duty cycle of the one or more LEDs according to one or more operational settings. Input device 506 may comprise a button disposed on a surface of the housing of handheld charger 500. Input device 506 may engage a sensor and/or a circuit, when pressed by a user, to send a signal to an internal processor of input device 506. Handheld charger 500 may comprise one or more device charging cables 508*a-c*. In an embodiment, charging cable 508*a* may be configured as a USB-C charging cable; charging cable 508*b* may be configured as a Micro USB charging cord; and charging cable 508*c* may be configured as a LIGHTNING charging cord. Charging cables 508*a-c* may enable a power transfer interface between an internal battery of handheld charger 500 and an internal charger of a mobile electronic device, such as a smart phone or tablet computer. According to an embodiment, docking station 510 is configured to receive one or more handheld chargers 500*a-n* at one or more charger ports 514. One or more charger ports 514 may be configured as a complementary shape to handheld chargers 500*a-n* such that handheld chargers 500*a-n* may be interfaced with charger ports 514 for storage and recharging. Charger ports 514 may further comprise a power transfer interface 512 configured to provide a flow of power from docking station 510 to an internal charger of handheld charger 500. Power transfer interface 512 may comprise one or more contact terminals configured to establish a connection with one or more contact terminals of handheld charger 500. Alternatively, power transfer interface 512 may comprise an inductive charging interface to enable a wireless transmission of power between docking station 510 and handheld charger 500.

Figure 6:
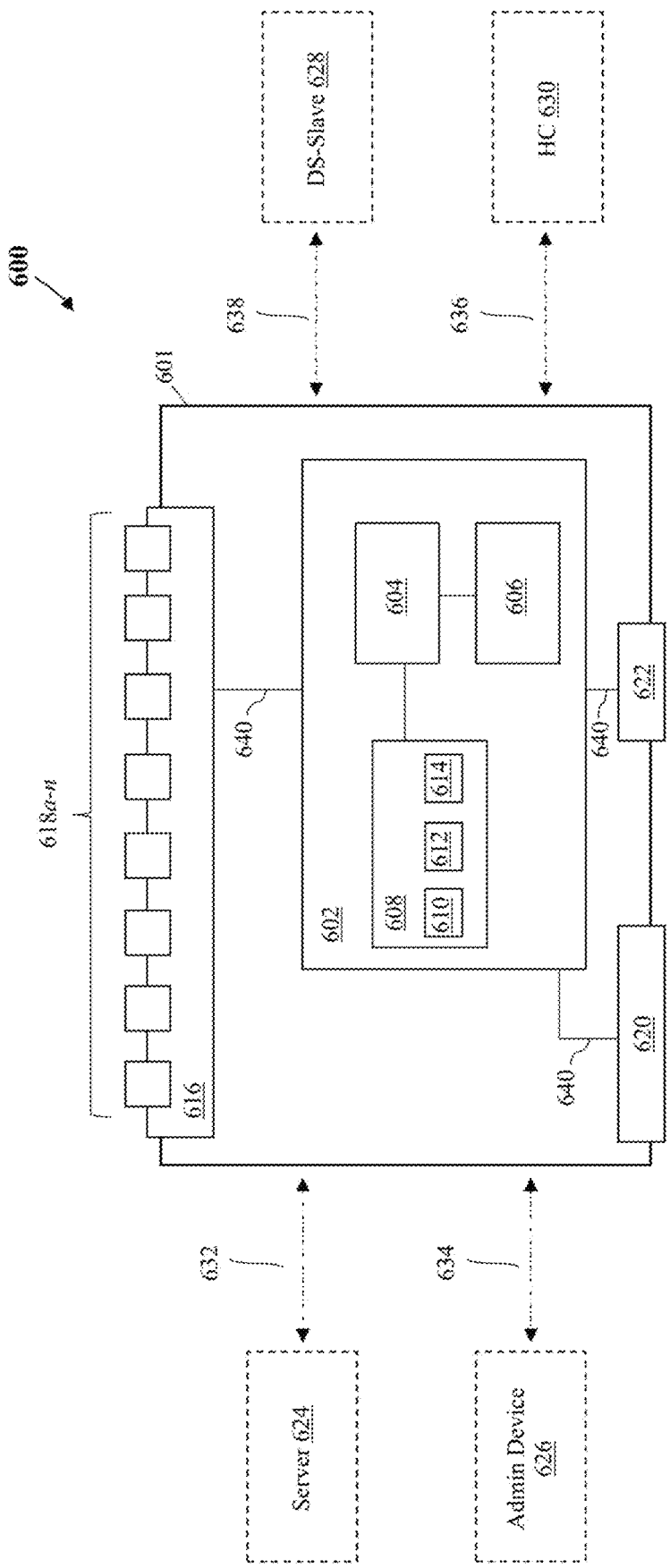
FIG. 6 is a functional block diagram of an exemplary docking station being incorporated in a content distribution system with mobile charging interface.

Referring now to FIG. 6, a functional block diagram of an exemplary docking station 600 is shown. In accordance with certain aspects of the present disclosure, docking station 600 (and docking station slave 628) may comprise an exemplary embodiment of docking station 202 of system 200 (as shown in FIG. 2). In accordance with certain aspects of the present disclosure, server 624 may comprise an exemplary embodiment of server 210 (as shown in FIG. 2); administrator device 626 may comprise an exemplary embodiment of administrator device 206 (as shown in FIG. 2); and handheld charger 630 may comprise an exemplary embodiment of handheld charger 204 (as shown in FIG. 2). In accordance with an embodiment, docking station 600 may comprise a housing 601 being configured to define an external surface and an interior portion in which one or more electronic components of docking station 600 may be housed. Docking station 600 may comprise a form factor such as that of docking station 510, as shown in FIG. 5. Docking station 600 may comprise a controller 602 configured to enable a plurality of operations of docking station 600. Controller 602 may be comprised of a processor 604, a non-transitory memory device 606, and a wireless communication chipset 608. In accordance with certain embodiments, wireless communication chipset 608 may include a BLUETOOTH chipset 610, a WIFI chipset 612, and a LORA chipset 614. In accordance with certain embodiments, BLUETOOTH chipset 610, a WIFI chipset 612, and a LORA chipset 614 may be incorporated into a single integrated chipset. Controller 602 may be operably engaged with a power supply 622 via system bus 640 to receive a flow of power from a power source. In certain embodiments, power supply 622 may be housed within housing 601 and configured to draw less than or equal to 4.5 amps at 120V AC or 2.25 amps at 240V AC. Power supply 622 may comprise a connector configured to interface with a power outlet; for example, a standard NEMA 5-15R connector. Docking station 600 may further comprise a fan, heatsink, or other thermal sink to prevent overheating of one or more electronic components. Memory device 606 may comprise one or more processor-executable instructions stored thereon to command processor 604 to perform one or more operations. In an embodiment, memory device 606 may have an internal data storage capacity sufficient to store a plurality of digital assets comprising up to 10 minutes of digital video having a resolution of not less than one megapixel, a color depth of not less than 16-bit, and a refresh rate of not less than 30 Hz, plus 100% overhead minimum.

Docking station 600 may further comprise a charger dock 616 being operably engaged with controller 602 via system bus 640. Charger dock 616 may comprise one or more charger ports 618*a-n* being disposed on a surface of housing 601 and configured to receive and store one or more handheld chargers 630. Charger ports 618*a-n* may comprise one or more contact terminals operably engaged with system bus 640 to provide a power transfer interface between charger ports 618*a-n* and the one or more handheld chargers. Charger ports 618*a-n* may be configured such that a handheld charger 630 may be operably interfaced with the one or more contact terminals upon being placed into one of charger ports 618*a-n*. The one or more contact terminals may be waterproof or water-resistant. In certain embodiments, charger dock 616 is configured to fully recharge a depleted handheld controller in less than 20 minutes. In an exemplary embodiment, charger dock 616 is configured to receive and charge up to eight handheld controllers simultaneously.

In certain embodiments, docking station 600 may further comprise one or more LEDs 620 disposed on a surface of housing 601 and operably engaged with controller 602 via system bus 640. In accordance with certain aspects of the present disclosure, controller 602 may be configured to establish a communications interface 632 with a remote server 624. In certain embodiments, WIFI chipset 612 is configured to establish a WIFI connection to enable communications interface 632. Controller 602 may be further configured to establish a communications interface 634 with administrator device 626. In certain embodiments, BLUETOOTH chipset 610 is configured to establish a BLUETOOTH connection between wireless chipset 608 and administrator device 626 to enable communications interface 632. Controller 602 may be further configured to establish a communications interface 638 with a slave docking station 628. In certain embodiments, BLUETOOTH chipset 610 is configured to establish a BLUETOOTH connection between wireless chipset 608 and slave docking station 628 to enable communications interface 632. Controller 602 may be further configured to establish a communications interface 636 with at least one handheld charger 630. In certain embodiments, LORA chipset 614 is configured to establish a low-power radio frequency communication interface (e.g. LORA) between wireless chipset 608 and handheld charger 630 to enable communications interface 632. In certain embodiments, docking station 600 is configured to serve as a broker station between administrator device 626 and handheld controllers 630, in accordance with one or more network protocols. In certain embodiments, docking station 600 is configured to serve as a broker station between server 624 and handheld controllers 630, in accordance with one or more network protocols.

In accordance with certain embodiments, processor 604, memory device 606 and wireless communication chipset 608 may be operably engaged to execute one or more network protocols to receive and send one or more data packets to and from administrator device 626, and receive and send one or more data packets to and from handheld controller 630. Memory device 606 may comprise one of more processor-executable instruction to cause processor 604 to process a payload of the one or more data packets and perform one or more operations for provisioning handheld controllers 630, assigning handheld controllers 630 to a device roster, registering button-press events from handheld controllers 630, determining a signal strength of handheld controllers 630, and other operations to ensure overall system requirements are met. Processor 604, memory device 606 and wireless communication chipset 608 may be operably engaged to establish and control one or more geofence settings. Handheld controller 630 may communicate with controller 602 via communications interface 636 to determine whether handheld controller 630 has exceeded a virtual boundary defined by the one or more geofence settings. Processor 604, memory device 606 and wireless communication chipset 608 may be operably engaged to execute one or more network protocols to receive and send one or more data packets to and from administrator device 626 and/or server 624 to receive over-the-air firmware and software updates via communications interface 634 and/or communications interface 632. In certain embodiments, controller 602 may send a request to handheld charger 630 via communications interface 636 at designated time intervals (e.g. five seconds) to determine a charge status and signal strength of handheld charger 630. Controller 602 may communicate the charge status and signal strength of handheld charger 630 to administrator device 626 via communications interface 634. In accordance with certain embodiments, controller 602 may be configured to command the highest-charged handheld charger 630 to flash a lighting output upon a request from administrator device 626 to assign a new handheld charger 630 to a customer. In accordance with certain embodiments, controller 602 may be communicably engaged with each handheld controller 630 that is docked in one or more charger ports 618a-n. Controller 602 and handheld controller 630 may be communicably engaged via one or more digital or serial communication means, including via one or more RX/TX pins. Controller 602 and handheld charger 630 may be communicably engaged to execute one or more data transfer protocols, including but not limited to: loading digital assets onto handheld controller 608; updating firmware on handheld controller 608; and downloading device data from handheld controller 608 (for example, content display data, device interaction data, temporal data comprising timing of device interactions and content display, battery charge level over time) to docking station 600. Controller 602 may be configured to package device data downloaded from handheld controller 608 and communicate the device data to server 624 via communications interface 632 and/or administrator device 262 via communications interface 634.

Figure 7:
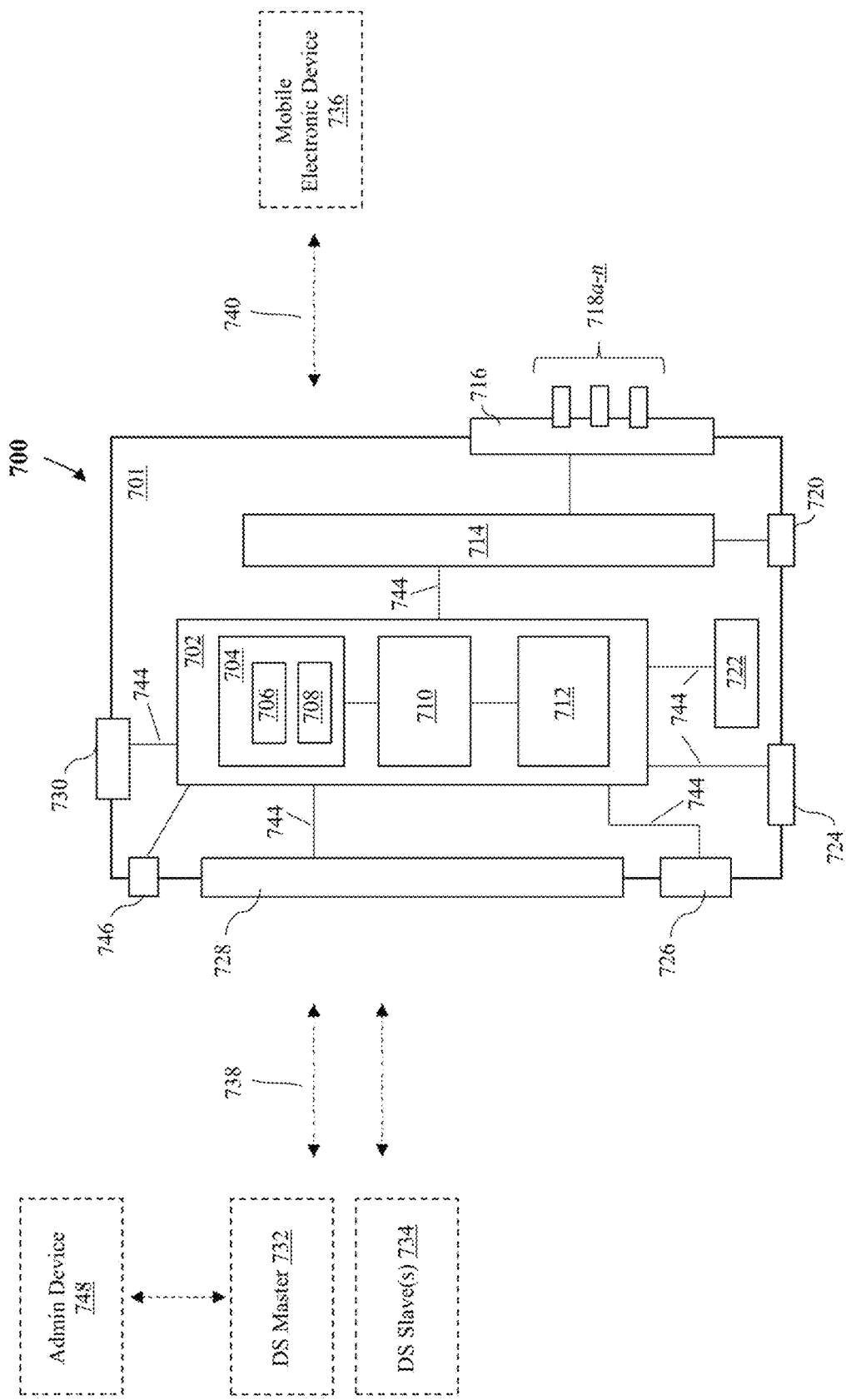
FIG. 7 is a functional block diagram of an exemplary handheld charging device being incorporated in a content distribution system with mobile charging interface.

Referring now to FIG. 7, a functional block diagram of an exemplary handheld charger 700 is shown. In accordance with certain aspects of the present disclosure, handheld charger 700 may comprise handheld charger 630 (as shown in FIG. 6) and/or may comprise handheld charger 204 of system 200 (as shown in FIG. 2). In accordance with certain aspects of the present disclosure, docking station master 732 and docking station slave 734 may each be configured as docking station 600 (as shown in FIG. 6) and/or docking station 202 of system 200 (as shown in FIG. 2). Administrator device 748 may comprise administrator device 626 (as shown in FIG. 6) and/or may comprise administrator device 206 of system 200 (as shown in FIG. 2). Mobile electronic device 736 may be configured as any commercial-off-the-shelf mobile electronic device, such as a smart phone or tablet computer, and may be configured as mobile electronic device 208 of system 200 (as shown in FIG. 2). In accordance with an embodiment, handheld charger 700 may comprise a housing 701 being configured to define an external surface and an interior portion in which one or more electronic components of handheld charger 700 may be housed. Handheld charger 700 may comprise a form factor such as that of handheld charger 500, as shown in FIG. 5. In accordance with certain embodiments, handheld charger 700 may comprise a controller 702 comprising a wireless communication chipset 704, a processor 710, and a non-transitory computer readable memory device 712. Memory device 712 may comprise one or more processor-executable instructions stored thereon to command processor 710 to perform one or more operations. In an embodiment, memory device 712 may have an internal data storage capacity sufficient to store a plurality of digital assets comprising up to 10 minutes of digital video having a resolution of not less than one megapixel, a color depth of not less than 16-bit, and a refresh rate of not less than 30 Hz, plus 100% overhead minimum. Memory 712 may be configured to have an internal data storage capacity sufficient to store a plurality of digital assets comprising up to 50 video advertisements having a resolution of not less than one megapixel, a color depth of not less than 16-bit, and a refresh rate of not less than 30 Hz, plus 100% overhead minimum. Controller 702 may be operably engaged with a display 728 to render and output a visual output comprising one or more digital content files, and a speaker 724 to render and output an audio output comprising one or more digital content files. Controller 702 may be operably engaged with display 728 and speaker 724 via a system bus 744. In an embodiment, display 728 may comprise an LED or LCD display having a resolution of not less than one megapixel, a color depth of not less than 16-bit, and a refresh rate of not less than 30 Hz.

In accordance with certain embodiments, handheld charger 700 may further comprise an optical sensor 746 communicably engaged with controller 702 and configured to scan a machine-readable optical code (such as a QR code). Handheld charger 700 may further comprise a lighting device 730 comprising one or more LEDs. Lighting device 730 may be communicably engaged with controller 702 to generate a light output in response to one or more command signals from controller 702. In accordance with certain embodiments, controller 702 may be communicably engaged with lighting device 730 to illuminate a proportional to the number of LEDs to indicate a charge level of battery 714 (for example, if battery 714 is at a 50% charge, controller 702 may cause lighting device 730 to illuminate 50% of the number of LEDs and/or luminous output). Handheld charger 700 may further comprise a vibrating motor 722 communicably engaged with controller 702 and configured to generate a vibrational (e.g., haptic) output in response to one or more command signals from controller 702. Handheld charger 700 may further comprise a fan, heatsink, or other thermal sink to prevent overheating of one or more electronic components. Handheld charger 700 may further comprise a battery 714 being configured to store a charge of power and provide power to controller 702, and all other electronic elements of handheld charger 700, via system bus 744. Battery 714 may be operably engaged with a battery charger 720 to receive power from a power source and provide a charge to battery 714. In accordance with certain embodiments, battery charger 720 and battery 714 may be operably configured to establish a power transfer interface with docketing station master 732 and/or docking station slave 734 and be operable to recharge battery 714 from 0% to 100% in less than 20 minutes. Handheld charger 700 may further comprise a charging interface 716 comprising one or more charging cables 718a-n. In an embodiment, a charging cable 718a may be configured as a USB-C charging cable; charging cable 718b may be configured as a Micro USB charging cable; and charging cable 508c may be configured as a LIGHTNING charging cable. Charging cables 508a-c may enable a power transfer interface between battery 714 and an internal charger of mobile electronic device 736. In an embodiment, charging interface 716 may be operably engaged with battery 714 to charge mobile electronic device 736 from 0% to 75% in less than 40 minutes (assuming mobile electronic device 736 is capable of accepting such a charge rate). In certain embodiments, battery 714 may have a power storage capacity in the range of about 1000 milliamp hours to about 10,000 milliamp hours. However, it is anticipated that battery 714 may have a power storage capacity above or below this range in accordance with certain exemplary embodiments and commercial use cases.

In accordance with certain embodiments, handheld charger 700 may be configured to establish a wireless communications interface 738 between controller 702 and docking station master 732 to send and receive one or more communications from administrator device 748 via docking station master 732. In accordance with certain embodiments, administrator device 748 may be configured to send one or more command signals to controller 702 via docking station master 732. Controller 702 may be configured to process, with processor 710, the one or more command signals to cause handheld charger 700 to perform one or more operations and/or initiate one or more modes of operation. For example, administrator device 748 may be configured to send a command signal configured to cause controller 702 to execute a mode of operation comprising a "Page Mode." In accordance with an embodiment, upon initiating a Page Mode controller 702 is operable to engage an output from vibrating motor 722, speaker 724, and lighting output 730, and display 728 is configured to alert a user of handheld charger 700 to take a specified action (e.g., return handheld charger 700 to a specified location within a venue). In accordance with certain embodiments, controller 702 may be operably engaged with optical sensor 746 to scan a machine-readable optical code (e.g. a QR code) being presented on a display of mobile electronic device 736. Controller 702 may be operable to process a data packet received by the machine-readable optical code and establish a communications interface 740 between handheld charger 700 and mobile electronic device 736. Alternatively, handheld charger 700 may be configured to present a machine-readable optical code via display 728. Mobile electronic device 736 may be configured to scan the machine-readable optical code and process a data packet received by the machine-readable optical code to establish communications interface 740 between handheld charger 700 and mobile electronic device 736. Alternatively, handheld charger 700 may be configured to present an alphanumeric code via display 728. A user of mobile electronic device 736 may input the alphanumeric code via a graphical user interface of a user application to establish communications interface 740 between handheld charger 700 and mobile electronic device 736.

In accordance with certain embodiments, handheld charger 700 may be communicably engaged with docking station master 732 and/or docking station slave 734 via communications interface 738 to receive a plurality of data packets comprising digital assets, software and/or other device data, and store the data in memory 712 (as constrained by a data storage limit for memory 712). Handheld charger 700 may be communicably engaged with docking station master 732 and/or docking station slave 734 via communications interface 738 to provide location data for handheld charger 700 in order to determine whether handheld charger 700 is inside or outside of a virtual boundary of a geofence setting. In accordance with certain embodiments, handheld charger 700 may be configured to execute an alternative mode of operation upon exceeding the boundary of the geofence setting (e.g. a "Suicide Mode"). In accordance with an embodiment, upon executing a "Suicide Mode," controller 702 is configured to command a continuous output from speaker 724 and vibrate until handheld charger 700 returns to within the boundary of the geofence setting and re-establishes communication interface 738 with the docking station master 732 or docking station slave 734. In certain embodiments, handheld charger 700 may be configured to re-establish communication interface 738 with the docking station master 732 or docking station slave 734 upon being interfaced with charger dock 616 of docking station 600 (as shown in FIG. 6). If handheld charger 700 is not returned, handheld charger 700 may continue to broadcast a charge status and location until battery 714 is depleted. In certain embodiments, upon executing a "Suicide Mode," controller 702 is configured to disable or restrict some or all functions of handheld charger 700. For example, in certain embodiments controller 702 may be configured to disable the power transfer interface between battery 714 and mobile electronic device 736. Controller 702 may be further configured to disable the presentation of content via display 728 and/or present one or more user notifications or messages via display 728 (e.g., a message prompting the user to return handheld charger 700 to a designated location or area).

Handheld controller 700 may be communicably engaged with administrator device 748 via communications interface 738 with docking station master 732 to receive and process one or more data packets related to one or more system commands, functions and/or operational requirements. Controller 702 may receive and process the one or more data packets, and processor 710 may execute one or more operations in response to the one or more data packets. In certain embodiments, the one or more operations may comprise operations for provisioning handheld controller 700, assigning handheld controller 700 to a device roster, registering inputs from input device 726, determining a signal strength handheld controller 700, and other operations to ensure overall system requirements are met. Handheld controller 700 may be communicably engaged with docking station master 732 to receive and process, via controller 702, over-the-air firmware and software updates.

Figure 8:
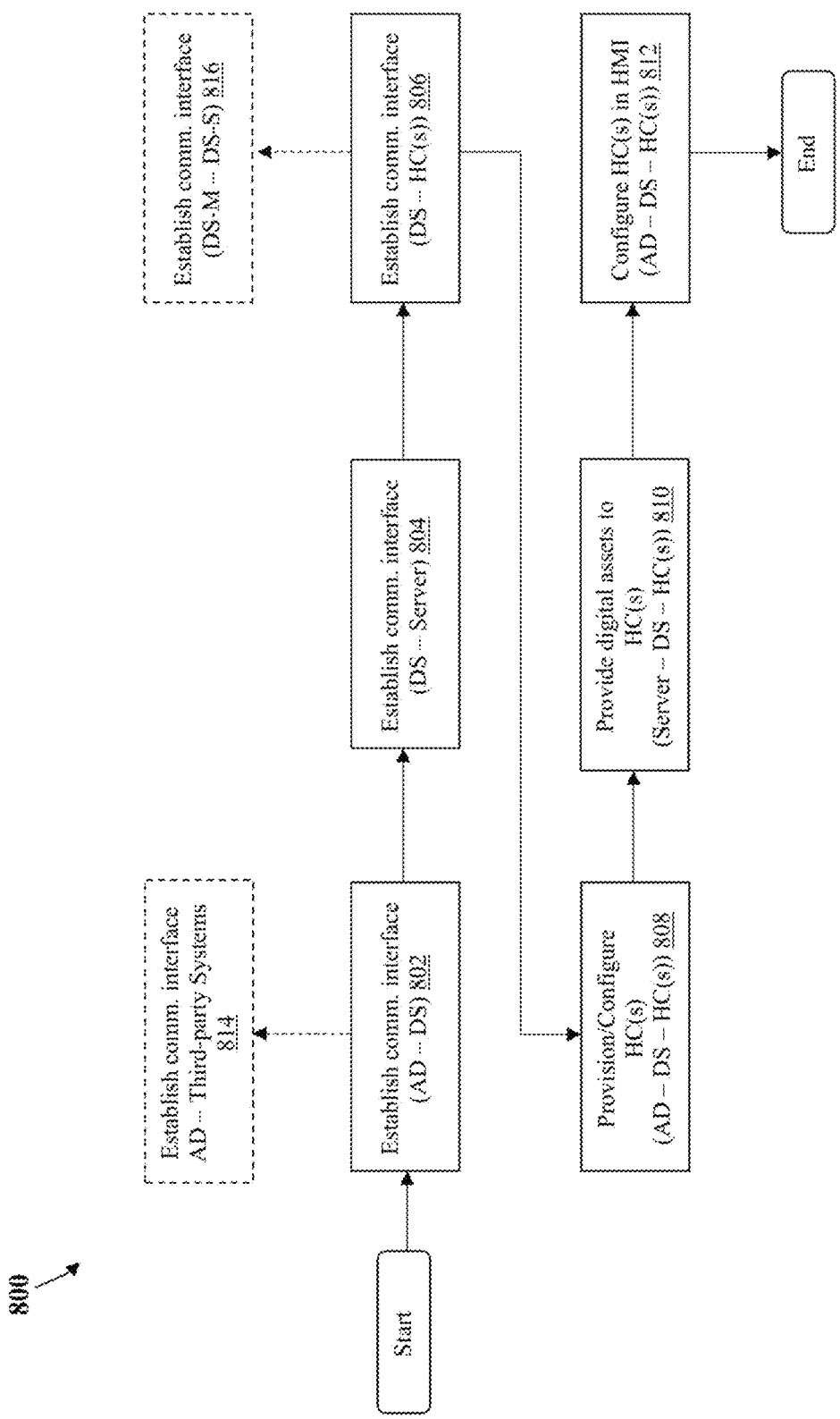
FIG. 8 is a process flow diagram of a routine within a content distribution system with mobile charging interface, in accordance with certain aspects of the present disclosure.

Referring now to FIG. 8, a process flow diagram of a routine 800 within a content distribution system is shown. Routine 800 may be implemented within content distribution system 200, as shown in FIG. 2. In accordance with certain aspects of the present disclosure, routine 800 may comprise provisioning a plurality of network protocols within a content distribution system (for example, content distribution system 200, as shown in FIG. 2). In accordance with an embodiment, routine 800 may be initiated by establishing a communications interface between an administrator device and a docking station (step 802). Routine 800 may optionally comprise establishing a communications interface between an administrator device and one or more third-party systems (step 814). Routine 800 may continue by establishing a communications interface between the docking station and a remote server (step 804). Routine 800 may continue by establishing a communications interface between the docking station and one or more handheld chargers (step 806). Routine 800 may optionally comprise establishing a communications interface between a master docking station and one or more slave docking stations (step 816). Routine 800 may continue by provisioning and/or configuring one or more control settings of the one or more handheld chargers (step 808). Step 808 may comprise routing a communication comprising the provisioning and/or control data from the administrator device to the docking station, and from the docking station to the one or more handheld chargers. Routine 800 may continue by providing one or more digital assets to the one or more handheld chargers (step 810). Step 810 may comprise routing a communication comprising the one or more digital assets from the remote server to the docking station, and from the docking station to the one or more handheld chargers. Routine 800 may conclude by configuring one or more status and/or settings for the one or more handheld chargers in a human-machine interface executing on the administrator device. (step 812). Step 810 may comprise routing a communication comprising the one or more operational or system data from the administrator device to the docking station, and from the docking station to the one or more handheld chargers.

Figure 9:
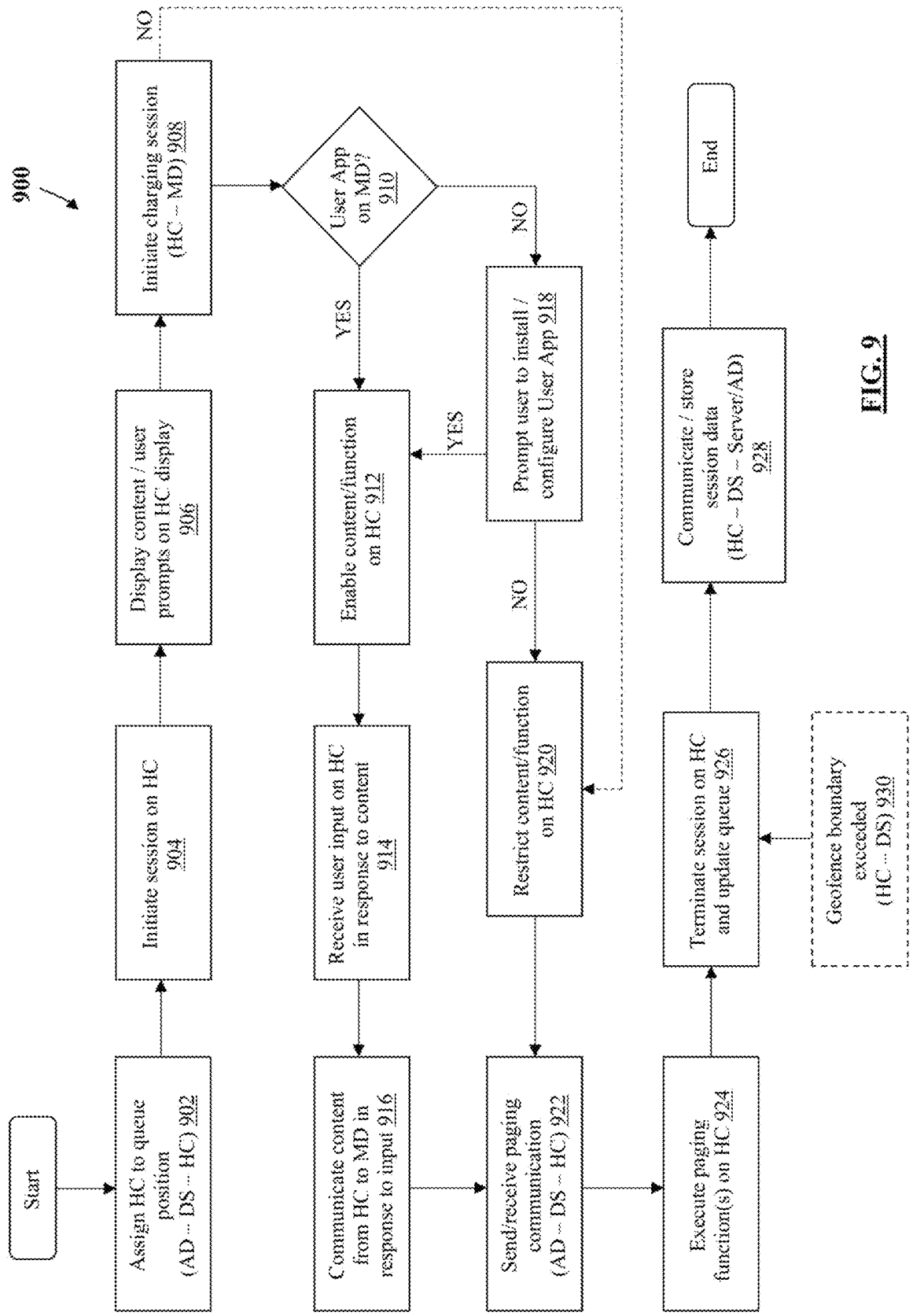
FIG. 9 is a process flow diagram of a routine within a content distribution system with mobile charging interface, in accordance with certain aspects of the present disclosure.

Referring now to FIG. 9, a process flow diagram of a routine 900 within a content distribution system is shown. Routine 900 may be implemented within content distribution system 200, as shown in FIG. 2. In accordance with certain aspects of the present disclosure, routine 900 may comprise a continuation of routine 800 and/or subroutine of routine 800 (as shown in FIG. 8). Routine 900 may be executed successively or concomitantly from routine 800 and/or may be executed independent of routine 800 (as shown in FIG. 8). In accordance with certain embodiments of the present disclosure, routine 900 may be initiated by assigning a handheld charger to a position in a queue of handheld chargers within a human-machine interface executing on an administrator device (step 902). Step 902 may comprise providing a communication configured to assign the handheld charger to a queue position from the administrator device to the docking station, and from the docking station to the handheld charger. Routine 900 may continue by initiating, with the handheld charger, an operational mode comprising a charging and content display session (step 904). Routine 900 may continue by displaying, via a display device of the handheld charger, audio/video content comprising one or more commercial advertisements and one or more user prompts configured to prompt a view to initiate a charging session between the handheld charger and a mobile electronic device (step 908). If the user does not initiate a charging session between the handheld charger and the mobile electronic device, either within a specified time period or in response to a user input, routine 900 continues by restricting and/or disabling one or more display or power functions of the handheld charger (step 920). If the user initiates a charging session between the handheld charger and the mobile electronic device, routine 900 continues with a decision step 910 to determine whether the mobile electronic device contains a user application for the handheld charger and/or whether the user has a user account for the user application. If YES, routine 900 continues by presenting digital content via the display of the handheld charger and enabling one or more power transfer interface between the handheld charger and the mobile electronic device (step 912). If NO, routine 900 continues by presenting a user prompt, via the display of the handheld charger, configured to prompt the user to install or configure the user application (step 918). If the user does not install the user application for the handheld charger on the mobile electronic device and/or does not configure a user account for the user application, either within a specified time period or in response to a user input, routine 900 continues by restricting and/or disabling one or more display or power functions of the handheld charger (step 920). (Routine 900 may continue from step 920 to step 922, as described below.) If the user does install the user application for the handheld charger on the mobile electronic device and/or configures a user account for the user application, routine 900 continues by presenting digital content via the display device of the handheld charger and enabling one or more power transfer interface between the handheld charger and the mobile electronic device (step 912). Routine 900 may continue by receiving a user input, via an input device on the handheld charger, in response to digital content being displayed on the display device of the handheld charger (step 914). Routine 900 may continue by communicating, via a wireless communications interface, a digital content file from the handheld charger to the mobile electronic device in response to the user input (step 914). In certain embodiments, step 914 further comprises determining a temporal relationship between the user input and a time location within the digital content file. Step 914 may be further configured to select a digital content file according to the temporal relationship between the user input and a time location within the digital content file.

In accordance with certain embodiments, routine 900 may continue by sending a paging communication from the administrator device to the docking station, and from the docking station to the handheld charger (step 922). Upon receiving the paging communication, the handheld charger may execute a Paging Mode comprising one or more paging functions (step 924). Routine 900 may continue by terminating the charging session for the handheld controller and updating the device queue, via the human-machine interface of the administrator device, to return the handheld controller to an available status within the device queue (step 926). In certain embodiments, step 926 may comprise terminating the charging session for the handheld controller via the human-machine interface of the administrator device and/or terminating the charging session for the handheld controller automatically in response to the expiration of a predetermined time period or upon establishing an interface between the handheld charger and the docking station. In certain embodiments, routine 900 may comprise determining whether a geofence boundary has been exceeded in response to a location communication from the handheld controller to the docking station (step 930). If the geofence boundary has been exceeded, routine 900 may terminate the charging session in accordance with step 926 and/or may execute one or more mode of operation or functionality of the handheld charger. Routine 900 may conclude by communicating charging session data from the handheld charger to the docking station, and from the docking station to the server and/or the administrator device (step 928). In certain embodiments, step 928 may be executed in response to establishing a charging interface between the handheld charger and the docking station.

Figure 10:
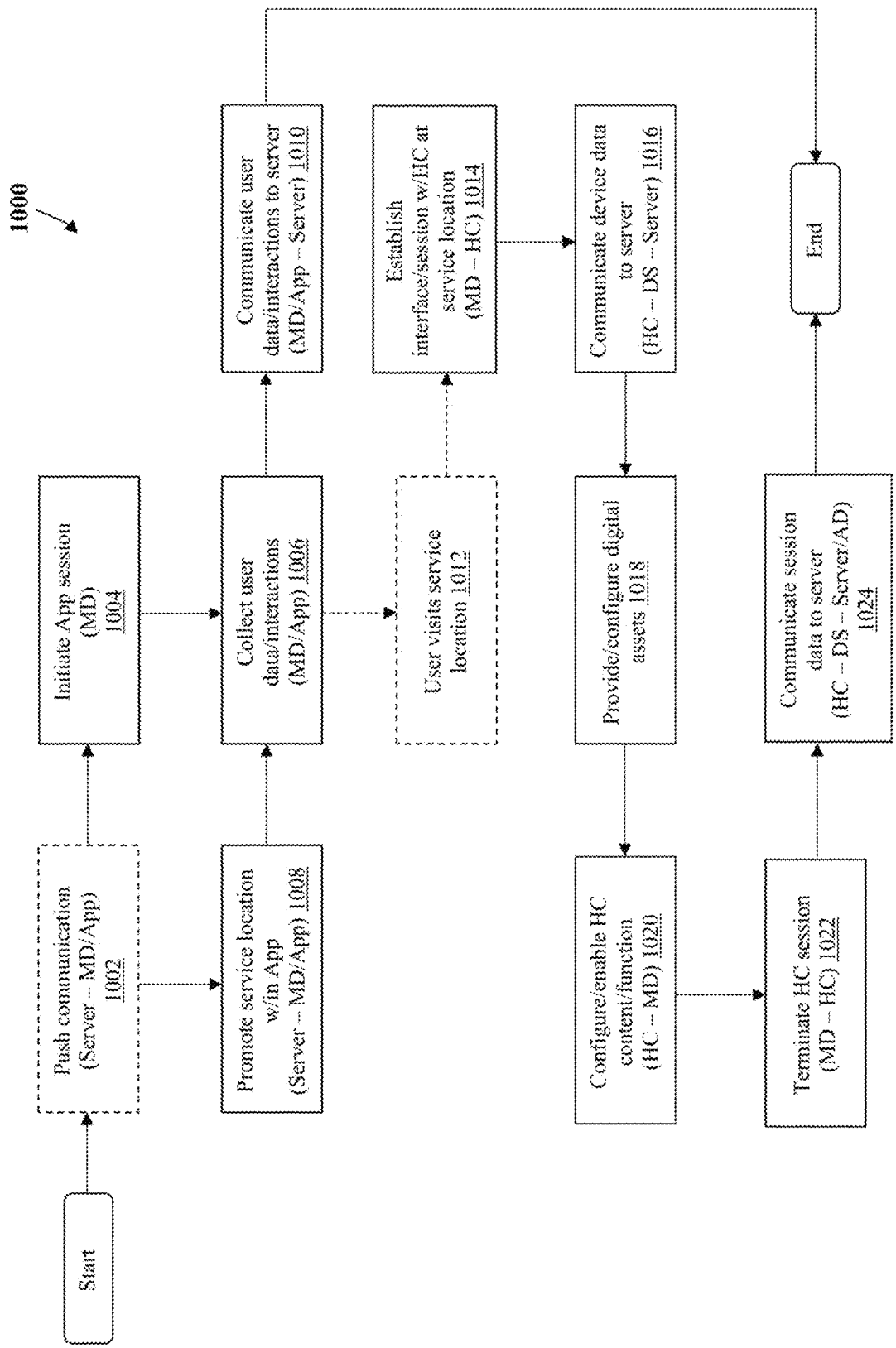
FIG. 10 is a process flow diagram of a routine within a content distribution system with mobile charging interface, in accordance with certain aspects of the present disclosure.

Referring now to FIG. 10, a process flow diagram of a routine 1000 within a content distribution system is shown. Routine 1000 may be implemented within content distribution system 200, as shown in FIG. 2. In accordance with certain aspects of the present disclosure, routine 1000 may comprise a continuation of routine 800 and/or subroutine of routine 800 (as shown in FIG. 8); and/or routine 1000 may comprise a continuation of routine 900 and/or subroutine of routine 900 (as shown in FIG. 8). Routine 1000 may be executed successively or concomitantly with routine 800 and/or may be executed independent of routine 800 (as shown in FIG. 8); and/or routine 1000 may be executed successively or concomitantly with routine 900 and/or may be executed independent of routine 900 (as shown in FIG. 9). In accordance with certain embodiments of the present disclosure, routine 1000 may (optionally) be initiated by pushing a communication from a remote server to a mobile electronic device having an associated user application installed (step 1002). In accordance with certain embodiments, step 1002 may further comprise pushing a communication from the server to the user application to promote one or more specific service locations associated with the content distribution system (step 1008). In accordance with certain embodiments, routine 1000 may continue from step 1002 by initiating a session of the user application on the mobile electronic device (step 1004). Routine 1000 may continue by collecting user-generated data and/or user interactions associated with the session of the user application (step 1006). Routine 1000 may continue by communicating the user data and/or interactions from the mobile electronic device to the server (step 1010). In accordance with certain instances of routine 1000, routine 1000 may conclude at step 1010. Alternatively, step 1006 may further comprise collecting user data and/or interactions from the mobile electronic device wherein the user visits a service location and the content distribution system is operably engaged (step 1012). Routine 1000 may continue by establishing, with the mobile electronic device, a communications interface between the mobile electronic device and a handheld charger being located at the service location and initiating a charging session between the handheld charger and the mobile electronic device (step 1014). Routine 1000 may continue by communicating device data to the server, wherein the device data comprises session data for the mobile electronic device (step 1016). In an embodiment, step 1016 may comprise communicating device data from the handheld charger to the docking station, and from the docking station to the server. Routine 1000 may continue by providing and/or configuring one or more digital assets in response to the device data (step 1018). Step 1016 may be executed at the handheld charger and may comprise providing content that is relevant or configured for the user in response to the user data. For example, the content may be selected based on one or more user preferences or user interaction, such as displaying a video advertisement for a brand in which the user has previously indicated an interest. Step 1016 may further comprise configuring one or more digital assets at the server and communicating the one or more digital assets from the server to the docking station, and from the docking station to the handheld controller. The one or more digital assets may comprise one or more offers or rewards based on one or more user preferences and/or user interactions. For example, the server may configure a digital asset comprising a coupon for use at the service location based on the one or more user preferences and/or user interactions, e.g. a coupon for an item that the user has previously purchased. Routine 1000 may continue by terminating the session between the handheld charger and the mobile electronic device in response to a command by the administrator device and/or in response to terminating the communications interface between the mobile electronic device and the handheld charger (step 1022). Routine 1000 may conclude by communicating charging session data from the handheld charger to the docking station, and from the docking station to the server and/or the administrator device (step 1024). In certain embodiments, step 1024 may be executed in response to establishing a charging interface between the handheld charger and the docking station.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. An interactive content distribution system, comprising:
a handheld charging device comprising a rechargeable battery, a charging interface configured to provide power from the rechargeable battery to a mobile electronic device, a wireless communications interface, an input/output device comprising a visual display, and a controller comprising a processor and a non-transitory computer readable medium having processor-executable instructions stored thereon that, when executed, cause the processor to perform one or more operations;
a docking station communicably engaged with the handheld charging device, the docking station comprising a docking interface configured to receive the handheld charging device, a charging interface configured to provide power to the rechargeable battery of the handheld charging device, and at least one wireless network interface; and
a remote server being communicably engaged with the docking station, the remote server being configured to communicate one or more digital assets to the docking station and receive handheld charging device activity data from the docking station;
wherein the one or more operations of the processor comprise operations for:
receiving the one or more digital assets from the docking station;
presenting the one or more digital assets via the visual display;
regulating a flow of power from the rechargeable battery to a mobile electronic device;
establishing a communication interface with the mobile electronic device;
receiving one or more user input data via the input/output device in response to presenting the one or more digital assets; and
providing at least one communication to the mobile electronic device in response to the one or more user input data.

2. The system of claim 1 further comprising an administrator device communicably engaged with the docking station and operable to configure one or more operations of the handheld charging device.

3. The system of claim 1 wherein the one or more operations of the processor comprise operations for communicating a hyperlink or resource locator to the mobile electronic device, the hyperlink or resource locator configured to enable the mobile electronic device to install a mobile application associated with the handheld charging device.

4. The system of claim 1 wherein the input/output device of the handheld charging device further comprises a button or touch screen interface configured to initiate at least one communications protocol for the mobile electronic device in response to a user input.

5. The system of claim 1 wherein the docking station is operably configured as a broker station between the handheld charging device and the remote server.

6. The system of claim 1 wherein the one or more operations of the processor further comprise operations for restricting or enabling the flow of power from the rechargeable battery to the mobile electronic device in response to one or more user interactions with the handheld charging device.

7. The system of claim 3 wherein the mobile application is configured to receive the one or more digital assets from the handheld control device or the remote server.

8. The system of claim 3 wherein the handheld charging device activity data comprises one or more user interactions with the handheld charging device or the mobile application.

9. An interactive content distribution system, comprising:
a handheld charging device comprising a rechargeable battery, a charging interface configured to provide power from the rechargeable battery to a mobile electronic device, a wireless communications interface, an input/output device comprising a visual display, and a controller configured to command one or more operations of the handheld charging device;
a docking station communicably engaged with the handheld charging device via the wireless communications interface, the docking station comprising a docking interface configured to receive the handheld charging device, a charging interface configured to provide power to the rechargeable battery of the handheld charging device, and at least one wireless network interface;
a remote server being communicably engaged with the docking station, the remote server being configured to send one or more digital assets to the docking station, wherein the docking station is configured to send the one or more digital assets to the handheld charging device; and
an administrator device communicably engaged with the docking station via the at least one wireless network interface and operable to configure one or more control settings for the handheld charging device, the one or more control settings being selected from the group consisting of a charging speed setting, a charging duration setting, and a content display setting,
wherein the docking station is configured as a communication hub between the administrator device and the handheld charging device.

10. The system of claim 9 wherein the handheld charging device is configured to restrict or enable the flow of power from the rechargeable battery to the mobile electronic device in response to one or more user interactions with the handheld charging device.

11. The system of claim 9 wherein the administrator device is operable to configure a geofence setting for the handheld charging device, wherein the geofence setting comprise a virtual boundary beyond which all or some functionality of the handheld charging device is disabled.

12. The system of claim 9 wherein the input/output device of the handheld charging device further comprises a button or touch screen interface, wherein the handheld charging device is configured to initiate at least one communications protocol for the mobile electronic device in response to a user input via the button or touch screen interface.

13. The system of claim 12 wherein the communications protocol is configured according to a temporal relationship between the user input and an output being presented on the visual display.

14. The system of claim 9 wherein the handheld charging device is configured to identify a known mobile electronic device according to one or more authorization parameters.

15. The system of claim 14 wherein the one or more operations of the handheld charging device comprise configuring one or more content or device settings in response to the one or more authorization parameters.

16. An interactive content distribution system, comprising:

a handheld charging device comprising a rechargeable battery, a charging interface configured to provide power from the rechargeable battery to a mobile electronic device, a wireless communications interface, an input/output device comprising a visual display, and a controller configured to command one or more operations of the handheld charging device;

a docking station communicably engaged with the handheld charging device, the docking station comprising a docking interface configured to receive the handheld charging device, a charging interface configured to provide power to the rechargeable battery of the handheld charging device, and at least one wireless network interface; and a remote server configured to provide one or more digital assets or user communication to an end user application being native to the mobile electronic device, the end user application being configured to authorize a charging session between the mobile electronic device and the handheld charging device.

17. The system of claim 16 wherein the remote server is communicably engaged with the docking station via the at least one wireless network interface and configured to send the one or more digital assets to the docking station for display by the handheld charging device.

18. The system of claim 17 wherein the handheld charging device is configured to receive one or more user parameters from the user application and configure one or more content settings in response to the one or more user parameters.

19. The system of claim 16 wherein the remote server is configured to provide a digital asset or user communication to the end user application according to one or more user interactions with the handheld charging device.

20. The system of claim 19 wherein the one or more user interactions comprise at least one user input via the input/output device of the handheld charging device.

* * * * *